(12) United States Patent
Duan et al.

(10) Patent No.: US 11,081,044 B2
(45) Date of Patent: Aug. 3, 2021

(54) ENCODING METHOD AND APPARATUS, DISPLAY APPARATUS, MEDIUM AND SIGNAL TRANSMISSION SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Xin Duan, Beijing (CN); Wei Sun, Beijing (CN); Ming Chen, Beijing (CN); Hsinchung Lo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/640,316

(22) PCT Filed: Aug. 23, 2019

(86) PCT No.: PCT/CN2019/102225
§ 371 (c)(1),
(2) Date: Feb. 19, 2020

(87) PCT Pub. No.: WO2020/038459
PCT Pub. Date: Feb. 27, 2020

(65) Prior Publication Data
US 2021/0174732 A1    Jun. 10, 2021

(30) Foreign Application Priority Data

Aug. 24, 2018  (CN) .......................... 201810979269.7

(51) Int. Cl.
*G09G 3/20* (2006.01)
*G09G 3/3208* (2016.01)
(Continued)

(52) U.S. Cl.
CPC ......... *G09G 3/2096* (2013.01); *G09G 3/3208* (2013.01); *G09G 3/36* (2013.01);
(Continued)

(58) Field of Classification Search
None
See application file for complete search history.

(56) References Cited

U.S. PATENT DOCUMENTS

2008/0074996 A1   3/2008  Fourcand
2009/0315743 A1  12/2009  Huang et al.
(Continued)

FOREIGN PATENT DOCUMENTS

CN    101548505 A    9/2009
CN    102014037 A    4/2011
(Continued)

OTHER PUBLICATIONS

First Office Action and English language translation, CN Application No. 201810979269.7, dated Dec. 2, 2019, 10 pp.
(Continued)

*Primary Examiner* — Ifedayo B Iluyomade
(74) *Attorney, Agent, or Firm* — Myers Bigel, P.A.

(57) ABSTRACT

This application relates to an encoding method and apparatus, and a display apparatus. The encoding method includes encoding 8-bit data corresponding to a to-be-encoded byte of to-be-transmitted data into alternative 10-bit data, the to-be-transmitted data including at least one to-be-encoded byte, detecting whether the first-digit data of the alternative 10-bit data is the same as the previous-digit data adjacent to the first-digit data, when the to-be-encoded byte is not the
(Continued)

first byte of the to-be-transmitted data, inverting the alternative 10-bit data to obtain target 10-bit data, when the numerical value of the first-digit data is the same as that of the previous-digit data, and determining the alternative 10-bit data as the target 10-bit data, when the numerical value of the first-digit data is different from that of the previous-digit data. The 8-bit data, the alternative 10-bit data and the target 10-bit data are binary data.

19 Claims, 8 Drawing Sheets

(51) Int. Cl.
G09G 3/36 (2006.01)
H04L 25/49 (2006.01)
(52) U.S. Cl.
CPC ...... G09G 2310/08 (2013.01); H04L 25/4906 (2013.01); H04L 25/4908 (2013.01); H04L 25/4915 (2013.01)

(56) References Cited

U.S. PATENT DOCUMENTS

2011/0205247 A1  8/2011  Yamashita
2020/0090615 A1* 3/2020  Zhu ................ H04L 25/4908

FOREIGN PATENT DOCUMENTS

| CN | 102523436 A | 6/2012 |
| CN | 103957083 A | 7/2014 |
| CN | 104052577 A | 9/2014 |
| CN | 104579583 A | 4/2015 |
| CN | 106788446 A | 5/2017 |
| CN | 109165001 A | 1/2019 |

OTHER PUBLICATIONS

First Office Action and English language translation, CN Application No. 20181097269.7, dated Dec. 2, 2019, 10 pp.

* cited by examiner

|  | enc[0] | enc[1] | enc[2] | enc[3] | enc[4] | enc[5] | enc[6] | enc[7] | enc[8] | enc[9] |
|---|---|---|---|---|---|---|---|---|---|---|
| Previous target 10-bit data | 1 | 0 | 1 | 1 | 1 | 0 | 0 | 1 | 1 | 1 |
| Alternative 10-bit data | 1 | 0 | 1 | 1 | 1 | 0 | 0 | 1 | 1 | 1 |

|  | dout[0] | dout[1] | dout[2] | dout[3] | dout[4] | dout[5] | dout[6] | dout[7] | dout[8] | dout[9] |
|---|---|---|---|---|---|---|---|---|---|---|
| Previous target 10-bit data | 1 | 0 | 1 | 1 | 1 | 0 | 0 | 1 | 1 | 1 |
| Target 10-bit data | 0 | 1 | 0 | 0 | 0 | 1 | 1 | 0 | 0 | 0 |

Fig.5

|  | din[0] | din[1] | din[2] | din[3] | din[4] | din[5] | din[6] | din[7] |
|---|---|---|---|---|---|---|---|---|
| Previous byte | 1 | 1 | 1 | 1 | 1 | 1 | 1 | 1 |
| To-be-encoded byte | 1 | 1 | 1 | 1 | 1 | 1 | 1 | 1 |

Fig.6

|  | enc[0] | enc[1] | enc[2] | enc[3] | enc[4] | enc[5] | enc[6] | enc[7] | enc[8] | enc[9] |
|---|---|---|---|---|---|---|---|---|---|---|
| Previous target 10-bit data | 1 | 0 | 0 | 1 | 1 | 0 | 1 | 1 | 1 | 0 |
| Alternative 10-bit data | 1 | 0 | 0 | 1 | 1 | 0 | 1 | 1 | 1 | 0 |

|  | dout[0] | dout[1] | dout[2] | dout[3] | dout[4] | dout[5] | dout[6] | dout[7] | dout[8] | dout[9] |
|---|---|---|---|---|---|---|---|---|---|---|
| Previous target 10-bit data | 1 | 0 | 0 | 1 | 1 | 0 | 1 | 1 | 1 | 0 |
| Alternative 10-bit data | 1 | 0 | 0 | 1 | 1 | 0 | 1 | 1 | 1 | 0 |

Fig.7

ENCODING METHOD AND APPARATUS, DISPLAY APPARATUS, MEDIUM AND SIGNAL TRANSMISSION SYSTEM

RELATED APPLICATIONS

The present application is a 35 U.S.C. 371 national stage application of PCT International Application No. PCT/CN2019/102225, filed on Aug. 23, 2019, which claims the benefit of Chinese Patent Application No. 201810979269.7, filed on Aug. 24, 2018, the entire disclosures of which are incorporated herein by reference.

TECHNICAL FIELD

This application relates to the field of panel manufacturing, and in particular, to an encoding method and apparatus, a display apparatus, a medium, and a signal transmission system.

BACKGROUND

A driving part of a liquid crystal display panel generally includes a timing controller, a source driver and a gate driver, wherein the main function of the controller is to process each frame of image data to generate a data signal and a control signal corresponding to each frame of image data, the data signal is communicated to the source driver, and the source driver converts the received data signal into a data voltage to be written to a corresponding pixel on the liquid crystal display panel.

With the increase of the resolution of the liquid crystal display panel, the rate of data transmission between the controller and the source driver in the liquid crystal display panel is higher and higher, and nowadays, there is an 8b/10b (i.e., encoding 8-bit data into 10-bit data) encoding method for high speed data transmission. In particular, 8-bit original data is divided into two parts, 5b/6b (i.e., encoding 5-bit data into 6-bit data) encoding is performed on the first 5 digits thereof, and 3b/4b (i.e., encoding 3-bit data into 4-bit data) encoding is performed on the last 3 digits thereof.

However, with the development of codec technology, in the current field of timing control, there are usually two approaches for signal transmission, Phase Locked Loop (PLL for short) and Delay-locked Loop (DLL for short), wherein the PLL is more common, and the DLL is not universal, for example, the above-mentioned encoding method only supports the PLL transmission approach and not the DLL transmission approach.

SUMMARY

In general, an encoding procedure will not take a jumping edge between every code word into account, which is not conducive to a transmission approach using the DLL, because a DLL transmission approach requires that a jumping edge needs to occur in the procedure of transmission and it relies on the jumping edge for time synchronization.

Embodiments of this application provide an encoding method and apparatus, a display apparatus, a medium and a signal transmission system. The technical solutions are as follows.

In a first aspect, there is provided an encoding method including:

encoding 8-bit data corresponding to a to-be-encoded byte of to-be-transmitted data into alternative 10-bit data, the to-be-transmitted data including at least one to-be-encoded byte;

detecting whether the first-digit data of the alternative 10-bit data is the same as the previous-digit data adjacent to the first-digit data, when the to-be-encoded byte is not the first byte of the to-be-transmitted data;

inverting the alternative 10-bit data to obtain target 10-bit data, when the numerical value of the first-digit data is the same as that of the previous-digit data;

determining the alternative 10-bit data as the target 10-bit data, when the numerical value of the first-digit data is different from that of the previous-digit data; wherein the 8-bit data, the alternative 10-bit data and the target 10-bit data is all binary data.

In an embodiment, the alternative 10-bit data satisfies:

$enc[k1]=\sim din[m]$;

$enc[k2]=\sim din[m]\char`^ F$;

wherein $enc[k1]$ is specified-digit data in the alternative 10-bit data, $enc[k2]$ is data in the alternative 10-bit data other than the specified-digit data, $din[m]$ is specified-digit data in the 8-bit data, F is data determined based on at least one of other digit data in the 8-bit data, $\sim$ represents performing an inversion operation, and $\char`^$ represents performing an exclusive OR operation.

In an embodiment, the encoding 8-bit data corresponding to a to-be-encoded byte of to-be-transmitted data into alternative 10-bit data includes:

encoding the 8-bit data into the alternative 10-bit data as follows:

$enc[9]=\sim din[3]$;

$enc[8]=\sim din[3]\char`^ din[7]$;

$enc[7]=\sim din[3]\char`^ din[4]$;

$enc[6]=\sim din[3]\char`^((\sim din[2]\&\sim din[1]\&\sim din[4])|(din[2]\&din[0])|(din[1]\&din[0]))$;

$enc[5]=\sim din[3]\char`^((\sim din[2]\&\sim din[1]\&\sim din[4])|(din[2]\&\sim din[0])|(din[1]\&\sim din[0]))$;

$enc[4]=\sim din[3]\char`^ din[6]$;

$enc[3]=\sim din[3]\char`^ din[5]$;

$enc[2]=\sim din[3]\char`^((din[2]\&\sim din[1])|(din[2]\&din[1]\&\sim din[3])|(\sim din[1]\&din[0]))$;

$enc[1]=\sim din[3]\char`^((\sim din[2]\&din[1])|(din[2]\&din[1]\&\sim din[3])|(\sim din[2]\&\sim din[0]))$;

$enc[0]=\sim din[3]\char`^ din[3]$;

wherein $enc[i]$ is the (i+1)-th digit data in the alternative 10-bit data, $9 \geq i \geq 0$, and i is an integer; $din[j]$ is the (j+1)-th digit data in the 8-bit data, $7 \geq j \geq 0$, and j is an integer; and $\&$ represents performing an AND operation, and $|$ represents performing an OR operation.

In an embodiment, the first-digit data of the alternative 10-bit data is a first numerical value, and the detecting whether the first-digit data of the alternative 10-bit data is the same as the previous-digit data adjacent to the first-digit data includes:

detecting whether the previous-digit data is the first numerical value;

determining that the first-digit data is the same as the previous-digit data when the previous-digit data is the first numerical value; and determining that the first-digit data is different from the previous-digit data when the previous-digit data is not the first numerical value.

In an embodiment, the method further includes:

adding a first identification code at a preset position of the encoded to-be-transmitted data to obtain target data, the first identification code being preset 10-bit data, the first identification code including at least 6 consecutive digits of the same data, the first identification code being used for identifying transmitted content, start of transmission or end of transmission, and the encoded to-be-transmitted data including the target 10-bit data obtained by encoding the 8-bit data corresponding to the to-be-encoded byte for sending.

In an embodiment, the method further includes:

splicing the first identification code and a second identification code to obtain a combined code, both the first identification code and the second identification code being preset 10-bit data and including at least 6 consecutive digits of the same data, and the second identification code being different from the first identification code; and adding the combined code at a preset position of the encoded to-be-transmitted data to obtain target data for sending.

In a second aspect, there is provided an encoding method including: encoding 8-bit data corresponding to a to-be-encoded byte of to-be-transmitted data into target 10-bit data as follows:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the 10-bit data, $9\geq i\geq 0$, and i is an integer; din[j] is the (j+1)-th digit data in the 8-bit data, $7\geq j\geq 0$, and j is an integer; and ~ represents performing an inversion operation, & represents performing an AND operation, | represents performing an OR operation, ^ represents performing an exclusive OR operation, and the 8-bit data and the target 10-bit data is binary data.

In a third aspect, there is provided an encoding apparatus including:

an encoder for encoding 8-bit data corresponding to a to-be-encoded byte of to-be-transmitted data into alternative 10-bit data, the to-be-transmitted data including at least one to-be-encoded byte;

a detector for detecting whether the first-digit data of the alternative 10-bit data is the same as the previous-digit data adjacent to the first-digit data, when the to-be-encoded byte is not the first byte of the to-be-transmitted data; and the encoder being further used for:

inverting the alternative 10-bit data to obtain target 10-bit data, when the numerical value of the first-digit data is the same as that of the previous-digit data; and determining the alternative 10-bit data as the target 10-bit data, when the numerical value of the first-digit data is different from that of the previous-digit data; wherein the 8-bit data, the alternative 10-bit data and the target 10-bit data is all binary data.

In an embodiment, the alternative 10-bit data satisfies:

$enc[k1]=\sim din[m]$;

$enc[k2]=\sim din[m]\hat{\ }F$;

wherein enc[k1] is specified-digit data in the alternative 10-bit data, enc[k2] is data in the alternative 10-bit data other than the specified-digit data, din[m] is specified-digit data in the 8-bit data, F is data determined based on at least one of other digit data in the 8-bit data, ~ represents performing an inversion operation, and ^ represents performing an exclusive OR operation.

In an embodiment, the encoder is used for:

encoding the 8-bit data into the alternative 10-bit data as follows:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the alternative 10-bit data, $9\geq i\geq 0$, and i is an integer; din[j] is the (j+1)-th digit data in the 8-bit data, $7\geq j\geq 0$, and j is an integer; and & represents performing an AND operation, and | represents performing an OR operation.

In an embodiment, the first-digit data of the alternative 10-bit data is a first numerical value, and the detector is used for:

detecting whether the previous-digit data is the first numerical value;

determining that the first-digit data is the same as the previous-digit data when the previous-digit data is the first numerical value; and determining that the first-digit data is different from the previous-digit data when the previous-digit data is not the first numerical value.

In an embodiment, the apparatus further includes:

a processor for adding a first identification code at a preset position of the encoded to-be-transmitted data to obtain target data, the first identification code being preset 10-bit data, the first identification code including at least 6 consecutive digits of the same data, the first identification code being used for identifying transmitted content, start of transmission or end of transmission, and the encoded to-betransmitted data including the target 10-bit data obtained by encoding the 8-bit data corresponding to the to-be-encoded byte for sending.

In an embodiment, the processor is used for:

splicing the first identification code and a second identification code to obtain a combined code, both the first identification code and the second identification code being preset 10-bit data and including at least 6 consecutive digits of the same data, and the second identification code being different from the first identification code; and adding the combined code at a preset position of the encoded to-be-transmitted data to obtain target data for sending.

In a fourth aspect, there is provided an encoding apparatus including:

an encoder for encoding 8-bit data corresponding to a to-be-encoded byte of to-be-transmitted data into target 10-bit data as follows:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the 10-bit data, 9≥i≥0, and i is an integer; din[j] is the (j+1)-th digit data in the 8-bit data, 7≥j≥0, and j is an integer; and ~ represents performing an inversion operation, & represents performing an AND operation, | represents performing an OR operation, ^ represents performing an exclusive OR operation, and the 8-bit data and the target 10-bit data is binary data.

In a fifth aspect, there is provided a display apparatus including:

a controller and a source driver chip including a controller and a plurality of source driver chips, the controller including an encoding apparatus as described in any of the third aspect and the fourth aspect.

In an embodiment, the display apparatus is a liquid crystal display apparatus or an OLED display apparatus, and the controller includes at least one of a timing controller, an SOC and an MCU.

In a sixth aspect, there is provided an encoding apparatus including:

a processor; and a memory for storing executable instructions of the processor;

wherein the processor is capable of implementing any of the encoding methods as described in the first aspect.

In a seventh aspect, there is provided a non-transitory computer readable storage medium, and when instructions in the non-transitory computer readable storage medium are executed by a processor, the processor is enabled to perform any of the encoding methods as described in the first aspect.

In an eighth aspect, there is provided a signal transmission system including:

a controller and a source driver chip including a controller and a plurality of source driver chips, both the controller and each of the source driver chips including an encoding apparatus as described in any of the third aspect and the fourth aspect.

It will be appreciated that, the above general description and the following detailed description is just exemplary, and cannot limit this application.

BRIEF DESCRIPTION OF THE DRAWINGS

In order to more clearly illustrate the embodiments of this application, the appended drawings needing to be used in the description of the embodiments will be introduced briefly in the following. Obviously, the drawings in the following description are only some embodiments of this application, and for the person having ordinary skills in the art, other drawings may also be obtained according to these drawings under the premise of not paying out undue experimentation.

FIG. 5 is a schematic diagram of a relationship between alternative 10-bit data and its previous 10-bit data shown according to an exemplary embodiment.

FIG. 6 is a schematic diagram of another relationship between a to-be-encoded byte and its previous byte shown according to an exemplary embodiment.

FIG. 7 is a schematic diagram of a relationship between alternative 10-bit data and its previous 10-bit data shown according to an exemplary embodiment.

The drawings herein are incorporated into the specification and constitute a part of the specification, show embodiments in accordance with this application, and are used for explaining the principle of this application along with the specification.

DETAILED DESCRIPTION

To make the objects, technical solutions and advantages of this application clearer, in the following, this application will be further described in detail in conjunction with the drawings. Obviously, the described embodiments are just a part of embodiments of this application, and not all the embodiments. Based on the embodiments in this application, all the other embodiments obtained by the person having ordinary skills in the art under the premise of not paying out undue experimentation pertain to the scope protected by this application.

Figure 1:
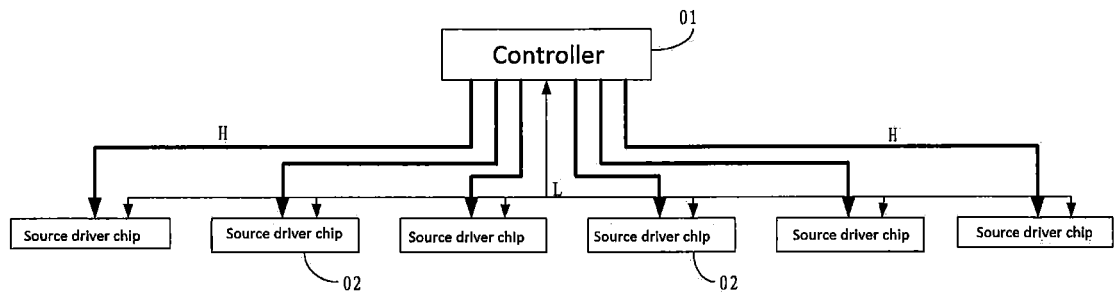
FIG. 1 is a schematic diagram of an application environment of an encoding method and a decoding method provided by an exemplary embodiment of the disclosure.

Reference is made to FIG. 1, which is a schematic diagram of an application environment of an encoding method provided by an exemplary embodiment of the disclosure. As shown in FIG. 1, the encoding method is applied in a display apparatus, the display apparatus includes a controller 01 and a plurality of source driver chips 02, a plurality of first signal lines H of the controller 01 are coupled to the plurality of source driver chips 02 in a one to one correspondence, the controller is also coupled to a second signal line L, and the plurality of source driver chips 02 are connected in parallel and coupled to the second signal line L. The signal transmission rate of a first signal line is less than that of the second signal line, the first signal line may be called a low speed signal line and is usually used for identifying a level state, and the second signal line may be called a high speed signal line and is usually used for transmitting a high speed differential signal. The controller 01 may be any of a timing controller, a system on chip (SOC for short) and a microcontroller unit (MCU) integrated into a timing controller.

It is noted that, the encoding method provided by the embodiment of the disclosure may also be applied in other implementation environment, FIG. 1 is just a schematic illustration, and the connection relationship between the controller and a source driver chip is also just a schematic illustration, and in fact, the connection relationship between the two will suffice as long as it is ensured that effective data transmission can be conducted between the two.

In an embodiment of the disclosure, there is provided a new 8b/10b (i.e., encoding 8-bit data into 10-bit data) encoding method, wherein both the 8-bit data before the encoding and the target 10-bit data obtained after the encoding is binary data, data transmitted between the controller 01 and a source driver chip 02 may be encoded by adopting the encoding method, and the data transmitted between the controller 01 and the source driver chip 02 may be data transmitted in a first signal line, or may also be data transmitted in the second signal line, which will not be limited by the embodiment of the disclosure.

Figure 2:
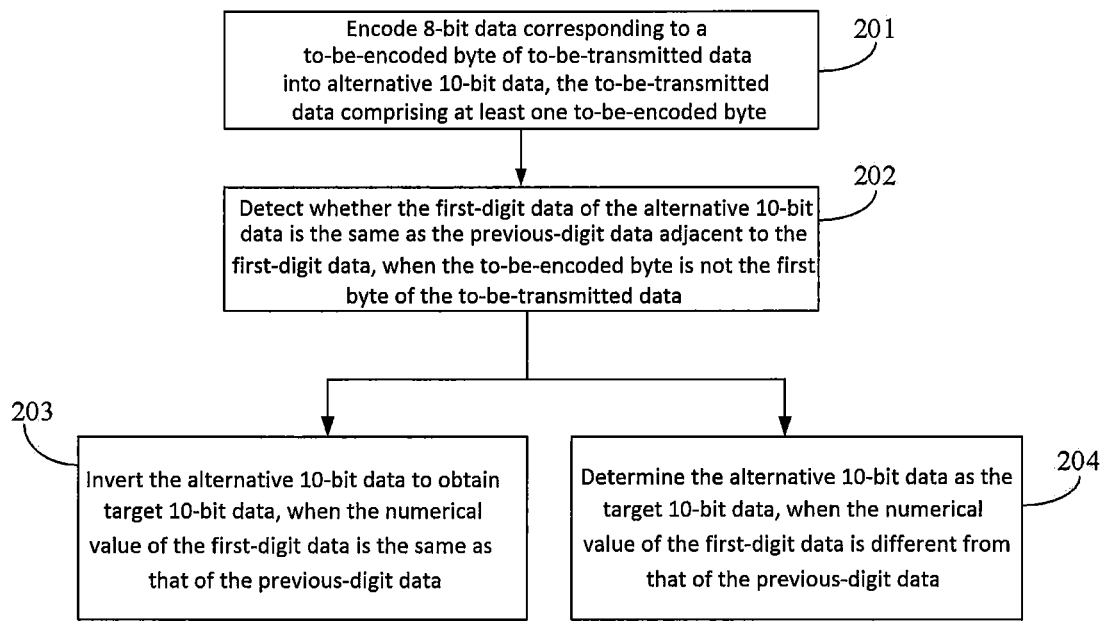
FIG. 2 is a flow diagram of an encoding method shown according to an exemplary embodiment.

As shown in FIG. 2, FIG. 2 is a flow diagram of an encoding method provided by an embodiment of the disclosure, which may be applied in the environment as shown in FIG. 1. The method includes:

step 201, encoding 8-bit data corresponding to a to-be-encoded byte of to-be-transmitted data into alternative 10-bit data, the to-be-transmitted data comprising at least one to-be-encoded byte;

step 202, detecting whether the first-digit data of the alternative 10-bit data is the same as the previous-digit data adjacent to the first-digit data, when the to-be-encoded byte is not the first byte of the to-be-transmitted data;

step 203, inverting the alternative 10-bit data to obtain target 10-bit data, when the numerical value of the first-digit data is the same as that of the previous-digit data;

step 204, determining the alternative 10-bit data as the target 10-bit data, when the numerical value of the first-digit data is different from that of the previous-digit data;

wherein all the above respective data is binary data.

For the encoding method provided by the embodiment of the disclosure, at the time of data encoding, 8-bit data is encoded into alternative 10-bit data first, then a jumping edge is arranged between every two adjacent 10-bit data, and the jumping edge may effectively reduce transmission errors. Moreover, the encoding approach as described above meets the requirements of the PLL and the DLL, such that a receiving end can support the signal transmission approaches of the PLL and the DLL simultaneously.

In practical applications, the less the consecutive and identical data in the transmitted data, the better the jitter performance is, and the better the jitter performance, the lower the probability of transmission errors is. The conventional 8b/10b encoding algorithm at least can ensure that in the encoded 10-bit data, there is at least one digit different from other digits in any consecutive six digits.

Another embodiment of the disclosure provides a flow diagram of another encoding method, which may be applied in an environment as shown in FIG. 1, and the method includes:

encoding 8-bit data corresponding to a to-be-encoded byte of to-be-transmitted data into target 10-bit data as follows:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the 10-bit data, $9\geq i\geq 0$, and i is an integer; din[j] is the (j+1)-th digit data in the 8-bit data, $7\geq j\geq 0$, and j is an integer; and ~ represents performing an inversion operation, & represents performing an AND operation, | represents performing an OR operation, ^ represents performing an exclusive OR operation, and the target 10-bit data is binary data.

The encoding method provided by the embodiment of the disclosure employs the above approach to encode 8-bit data into target 10-bit data, wherein there is at least one digit different from other digits in any consecutive five digits in the obtained target 10-bit data, which, as compared to the conventional encoding method, can reduce the amount of consecutive and identical data in every 10-bit data (i.e., each encoded byte), may ensure the encoded data has a better jitter performance in a subsequent transmission procedure, and thereby lower the probability of transmission errors.

Figures 3, 4:
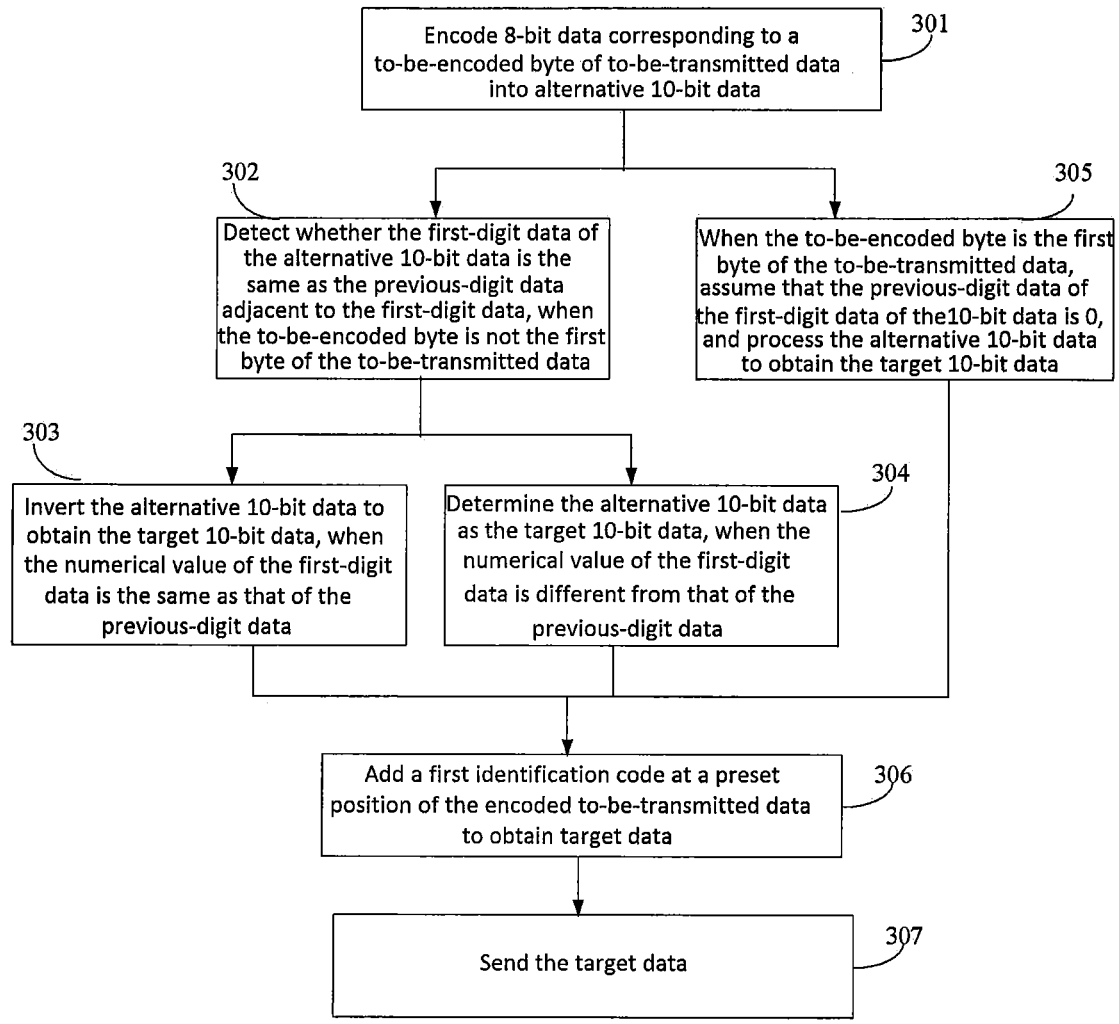
FIG. 3 is a flow diagram of another encoding method shown according to an exemplary embodiment.
FIG. 4 is a schematic diagram of a relationship between a to-be-encoded byte and its previous byte shown according to an exemplary embodiment.

An embodiment of the disclosure provides an encoding method, which, as shown in FIG. 3, may be applied in an environment as shown in FIG. 1, and the method includes the following steps.

At step 301, 8-bit data corresponding to a to-be-encoded byte of to-be-transmitted data is encoded into alternative 10-bit data. Step 302 or step 305 is to be performed.

Before data transmission, it is necessary to encode the to-be-transmitted data, the to-be-transmitted data includes at least one to-be-encoded byte, and each to-be-encoded byte is 8-bit data. It is noted that in the embodiments of the disclosure, at a sending end of data, the bit digits of the data are sorted from low digit to high digit. For example, the arrangement order of data 10000010 is from right to left, that is, its first-digit data is 0, its last-digit data is 1, "1000" is its high 4-digit data, and "0010" is its low four digits.

In an embodiment of the disclosure, the encoding basis for each digit data in the alternative 10-bit data includes the same digit data din[m] in the 8-bit data, din[m] is data of a specified digit in the 8-bit data, 7≥m≥0, and thus each digit data in the alternative 10-bit data is associated with the same digit data din[m]. In an embodiment of the disclosure, data of a specified digit may be set in the alternative 10-bit data, and the specified-digit data is associated with the aforementioned same digit data din[m]. Since each digit data in the alternative 10-bit data is associated with the same digit data din[m], and the specified-digit data is associated with the same digit data din[m], the specified-digit data may reflect the state of the alternative 10-bit data, for example, reflect whether the alternative 10-bit data has undergone an inversion operation subsequently, and a decoding end may perform corresponding processing based on the numerical value of the specified-digit data.

Exemplarily, the alternative 10-bit data satisfies:

$$enc[k1]=\sim din[m];$$

$$enc[k2]=\sim din[m]\hat{\ }F;$$

wherein enc[k1] is specified-digit data in the alternative 10-bit data, which specified-digit data is the (k1+1)-th digit data, enc[k2] is data in the alternative 10-bit data other than the specified-digit data, that is, data other than the (k1+1)-th digit data, F is data determined based on at least one of other digit data in the 8-bit data, ~ represents an inversion operation, and ^ represents performing an exclusive OR operation. The inversion operation represents inverting a binary digit, for example, 1 is inverted to 0, and 0 is inverted to 1; and the exclusive OR operation represents two binary digits XOR each other, and its rule is that it is true as long as the former and the latter are different, wherein true is 1, false is 0, and then 1^=0, 1^=1, 0^=1, 1^=0.

It can be seen from the above formulae that enc[k2]=enc[k1]^F, and it may be obvious that there is a relationship between other digit data and the specified-digit data. Assume that all digit data in the alternative 10-bit data is inverted to obtain target 10-bit data, and it may be seen that $$dout[k1]=\sim enc[k1]=\sim(\sim din[m])=din[m];$$

$$dout[k2]=\sim enc[k2]=\sim(\sim din[m]\hat{\ }F)=din[m]\hat{\ }F;$$

wherein dout[k1] is the specified-digit data in the target 10-bit data obtained by inverting the specified-digit data enc[k1] in the alternative 10-bit data, the specified-digit data is the (k1+1)-th digit data, and dout[k2] is data in the target 10-bit data obtained by inverting data in the alternative 10-bit data other than the specified-digit data, Thus, dout[k2]=dout[k1]^F, which is consistent with the relationship enc[k2]=enc[k1]^F. Therefore, in the embodiment of the disclosure, by employing the above-described encoding method, the relationship between respective data in the finally obtained target 10-bit data keeps unchanged relative to the alternative 10-bit data, no matter whether the alternative 10-bit data has been inverted. Therefore, after obtaining the target 10-bit data, the decoding end may decode it to obtain corresponding 8-bit data, no matter it is inverted. Thus, it may be possible to realize compatibility of the encoding method provided by the embodiment of the disclosure with the existing decoding methods, and at the time of decoding, it is unnecessary to take into account the relationship between to-be-decoded 10-bit data and previous 10-bit data, and the computational cost can be reduced.

Exemplarily, assume that the specified data is the tenth-digit data of the alternative 10-bit data, i.e., k1=9, and din[m] is the fourth-digit data of the 8-bit data, i.e., m=3, and a procedure of encoding 8-bit data corresponding to a to-be-encoded byte of to-be-transmitted data into alternative 10-bit data includes:

encoding the 8-bit data into the alternative 10-bit data as follows:

$$enc[9]=\sim din[3];$$

$$enc[8]=\sim din[3]\hat{\ }din[7];$$

$$enc[7]=\sim din[3]\hat{\ }din[4];$$

$$enc[6]=\sim din[3]\hat{\ }((\sim din[2]\&\sim din[1]\&\sim din[4])|(din[2]\&din[0])|(din[1]\&din[0]));$$

$$enc[5]=\sim din[3]\hat{\ }((\sim din[2]\&\sim din[1]\&\sim din[4])|(din[2]\&\sim din[0])|(din[1]\&\sim din[0]));$$

$$enc[4]=\sim din[3]\hat{\ }din[6];$$

$$enc[3]=\sim din[3]\hat{\ }din[5];$$

$$enc[2]=\sim din[3]\hat{\ }((din[2]\&\sim din[1])|(din[2]\&din[1]\&\sim din[3])|(\sim din[1]\&din[0]));$$

$$enc[1]=\sim din[3]\hat{\ }((\sim din[2]\&din[1])|(din[2]\&din[1]\&\sim din[3])|(\sim din[2]\&\sim din[0]));$$

$$enc[0]=\sim din[3]\hat{\ }din[3];$$

wherein enc[i] is the (i+1)-th digit data in the alternative 10-bit data, 9≥i≥0, and i is an integer; din[j] is the (j+1)-th digit data in the 8-bit data, 7≥j≥0, and j is an integer; and ~ represents performing an inversion operation, & represents performing an AND operation, | represents performing an OR operation, and ^ represents performing an exclusive OR operation.

The AND operation represents two binary digits AND each other, and its rule is that it is true only if both the former and the latter are 1, otherwise, it is false, wherein true is 1, false is 0, and then 1&1=1, 1&0=0, 0&1=0, 0&0=0; and the OR operation represents two binary digits OR each other, and its rule is that it is true if only one of the former and the latter is 1, wherein true is 1, false is 0, and then 1|1=1, 1|0=1, 0|1=1, 0|0=0.

Exemplarily, as shown in FIG. 4, assume that the to-be-encoded 8-bit data is 00000000, and its first-digit data to the eighth-digit data is successively 0, 0, 0, 0, 0, 0, 0, 0. Then, as shown in FIG. 5, according to the above encoding approach, it may be encoded to obtain alternative 10-bit data 1110011101, wherein in the alternative 10-bit data, the first-digit data $enc[0]=\sim din[3]\hat{\ }din[3]=1;$ the second-digit data $enc[1]=\sim din[3]\hat{\ }((\sim din[2]\&din[1])|(din[2]\&din[1]\&\sim din[3])|(\sim din[2]\&\sim din[0]))=0;$ the third-digit data $enc[2]=\sim din[3]\string^((din[2]\&\sim din[1])|(din[2]\&din[1]\&\sim din[3])|(\sim din[1]\&din[0]))=1$;

the fourth-digit data $enc[3]=\sim din[3]\string^din[5]=1$;

the fifth-digit data $enc[4]=\sim din[3]\string^din[6]=1$;

the sixth-digit data $enc[5]=\sim din[3]\string^((\sim din[2]\&\sim din[1]\&\sim din[4])|(din[2]\&\sim din[0])|(din[1]\&\sim din[0]))=0$;

the seventh-digit data $enc[6]=\sim din[3]\string^((\sim din[2]\&\sim din[1]\&\sim din[4])|(din[2]\&din[0])|(din[1]\&din[0]))=1\string^(0\,1|0|0)=0$;

the eighth-digit data $enc[7]=\sim din[3]\string^din[4]=1$;

the ninth-digit data $enc[8]=\sim din[3]\string^din[7]=1$;

the tenth-digit data $enc[9]=\sim din[3]=1$.

By the above encoding approach, it may be ensured that there is at least one digit different from other digits in any consecutive six digits of the obtained alternative 10-bit data, that is, 6 consecutive 0s or 6 consecutive 1s will not occur.

At the step 302, it is detected whether the first-digit data of the alternative 10-bit data is the same as the previous-digit data adjacent to the first-digit data, when the to-be-encoded byte is not the first byte of the to-be-transmitted data.

Since the to-be-transmitted data may include multiple bytes, and the encoding approach may be different for situations in which the to-be-encoded byte is the first byte and is not the first byte, at the time of encoding, it may be possible to first detect whether the to-be-encoded byte is the first byte of the to-be-transmitted data, and if no, since the data is encoded in order, it shows that there exist at least one encoded byte in front of the to-be-encoded byte, that is, byte(s) for which the 8b/10b encoding has been done. For a byte for which the 8b/10b encoding has been done, actually, original 8-bit digits of data have been converted into 10-bit digits of data, and therefore an encoded byte corresponds to 10-bit data. For the to-be-encoded alternative 10-bit data, it may be possible to detect the first-digit data of the alternative 10-bit data and the previous-digit data adjacent to the first-digit data (that is, the last digit of previous 10-bit data) so as to compare whether they are the same.

In an embodiment of the disclosure, in order to rapidly detect whether the first-digit data of the alternative 10-bit data is the same as the previous-digit data adjacent to the first-digit data, the first-digit data of the alternative 10-bit data may be set to a fixed first numerical value, and thus, it may be judged whether the first-digit data of the alternative 10-bit data is the same as the previous-digit data adjacent to the first-digit data by judging the previous-digit data adjacent to the first-digit data is equal to the first numerical value.

Then, the step 302 includes:

detecting whether the previous-digit data is the first numerical value; determining that the first-digit data is the same as the previous-digit data when the previous-digit data is the first numerical value; and determining that the first-digit data is different from the previous-digit data when the previous-digit data is not the first numerical value. Exemplarily, reference is made to the above encoding approach, the tenth-digit data $enc[9]=\sim din[m]\string^din[m]=1$, for example, $enc[9]=\sim din[3]\string^din[3]=1$, and at this point, the first numerical value is 1. Of course, the first numerical value may also be set to 0, as long as it is ensured that the encoded data can be decoded by the decoding end, which will not be limited by the embodiment of the disclosure.

If the first-digit data is the same as the previous-digit data, step 303 may be performed, and if the first-digit data is different from the previous-digit data, step 304 may be performed.

At the step 303, the alternative 10-bit data is inverted to obtain the target 10-bit data, when the numerical value of the first-digit data is the same as that of the previous-digit data. Step 306 is to be performed.

Exemplarily, reference is made to FIG. 4, which takes two adjacent bytes of the to-be-transmitted data as an example, wherein the first-digit data to the eight-digit data din[0]-din[7] of the to-be-encoded byte is 0, 0, 0, 0, 0, 0, 0, and 0, respectively, and the first-digit data to the eight-digit data din[0]-din[7] of the previous byte of the to-be-encoded byte is 0, 0, 0, 0, 0, 0, 0, and 0, respectively.

Referring to FIG. 5, the first-digit data to the tenth-digit data enc[0]-enc[9] of the alternative 10-bit data obtained by encoding the two bytes is 1, 0, 1, 1, 1, 0, 0, 1, 1, and 1, respectively. The first-digit data to the tenth-digit data enc[0]-enc[9] of the 10-bit data corresponding to the previous byte of the alternative 10-bit data, i.e., the previous target 10-bit data (10-bit data which has been encoded), is 1, 0, 1, 1, 1, 0, 0, 1, 1, and 1, respectively. Since the first-digit data of the alternative 10-bit data is 1, its previous-digit data is also 1, and both are the same, the alternative 10-bit data is inverted to obtain the target 10-bit data, and dout[0]-dout[9] of the target 10-bit data is 0, 1, 0, 0, 0, 1, 1, 0, 0, and 0, respectively.

At the step 304, the alternative 10-bit data is determined as the target 10-bit data, when the numerical value of the first-digit data is different from that of the previous-digit data. Step 306 is to be performed.

Exemplarily, reference is made to FIG. 6, which takes two adjacent bytes of the to-be-transmitted data as an example, wherein the first-digit data to the eight-digit data din[0]-din[7] of the to-be-encoded byte is 1, 1, 1, 1, 1, 1, 1, and 1, respectively, and the first-digit data to the eight-digit data din[0]-din[7] of the previous byte of the to-be-encoded byte is 1, 1, 1, 1, 1, 1, 1, and 1, respectively.

Referring to FIG. 7, the first-digit data to the tenth-digit data enc[0]-enc[9] of the alternative 10-bit data obtained by encoding the two bytes is 1, 0, 0, 1, 1, 0, 1, 1, 1, and 0, respectively. The first-digit data to the tenth-digit data enc[0]-enc[9] of the 10-bit data corresponding to the previous byte of the alternative 10-bit data, i.e., the previous target 10-bit data (10-bit data which has been encoded), is 1, 0, 0, 1, 1, 0, 1, 1, 1, and 0, respectively. Since the first-digit data of the alternative 10-bit data is 1, its previous-digit data is 0, and the two are different, the alternative 10-bit data enc[0]-enc[9] may be taken as the target 10-bit data dout[0]-dout[9] directly.

The above steps 302 to 304 may guarantee that there is a jumping edge between every two adjacent encoded bytes (namely, every two 10-bit data), which facilitates the receiving end to clearly differentiate between every two adjacent encoded bytes and implement accurate decoding.

At the step 305, when the to-be-encoded byte is the first byte of the to-be-transmitted data, assume that the previous-digit data of the first-digit data of the 10-bit data is 0, and the alternative 10-bit data is processed according to the step 303 or the step 304, to obtain the target 10-bit data. Step 306 is to be performed.

In the embodiment of the disclosure, since the to-be-encoded byte is the first byte of the to-be-transmitted data, the previous-digit data of the first-digit data of the alternative 10-bit data does not exist. The one embodiment of the disclosure simply assume that the previous-digit data is 0, and in other embodiments, it may also be assumed that the previous-digit data of its first-digit data is 1, and then other procedures may refer to the above steps 302 to 304.

In a practical application, when the to-be-encoded byte is the first byte of the to-be-transmitted data, other approaches may also be employed to process the alternative 10-bit data to obtain the target 10-bit data, as long as it is ensured that the receiving end can effectively decode it.

For example, when the to-be-encoded byte is the first byte of the to-be-transmitted data, that is, the previous-digit data does not exist before its first-digit data, it may be possible to assume that there is a jumping edge between the first-digit data of the alternative 10-bit data and the previous-digit data, and take the alternative 10-bit data as the target 10-bit data directly, of which a specific procedure may refer to the above step 304.

In a practical application, when the to-be-encoded byte is the first byte of the to-be-transmitted data, it may also be possible to assume that there is not a jumping edge between the first-digit data of the alternative 10-bit data and the previous-digit data, the alternative 10-bit data may be inverted to obtain the target 10-bit data, of which a specific procedure may refer to the above step 303.

It further needs to be noted that, when the to-be-encoded byte is the first byte of the to-be-transmitted data, it may also be assumed that the previous-digit data of its first-digit data is 1, and then the above steps 302-304 are performed, which will not be limited by the embodiments of the disclosure.

At the step 306, a first identification code is added at a preset position of the encoded to-be-transmitted data to obtain target data.

The encoded to-be-transmitted data includes the target 10-bit data obtained by encoding the 8-bit data corresponding to the to-be-encoded byte. In an embodiment, to ensure that the receiving end receives data in units of 10 bits, the sending end also needs to send data in units of 10 bits, and therefore, the first identification code needs to be 10-bit data, and it may be preset data, and it suffices that it plays the role of identification.

In the embodiment of the disclosure, the 8b/10b encoding algorithm provided by the steps 301 to 306 may guarantee that there is at least one digit different from other digits in any consecutive five digits of 10-bit data. Therefore, the first identification code may include at least 6 consecutive digits of the same data, so as to be distinguished from normally transmitted 10-bit data. Exemplarily, the identification code may include 6 consecutive 0s or 6 consecutive 1s, and the first identification code is used for identifying transmitted content, start of transmission or end of transmission.

Exemplarily, the first identification code may be K, of which a specific code value may refer to Table 1.

TABLE 1

| K1 | 0b0111111010 | 0b1000000101 |
| K2 | 0b0111111011 | 0b1000000100 |
| K3 | 0b0111111001 | 0b1000000110 |
| K4 | 0b0111111000 | 0b1000000111 |

Therein, 0b represents binary, each identification code in K1 to K4 corresponds to two representations, and its first-digit data (note: meaning the first digit in right low digits here) is determined according to the previous-digit data to ensure that a flipping edge is formed between it and the previous-digit data. For example, when the previous-digit data of the first-digit data of the K1 code is 0, the K1 code of which the first-digit data is 1, namely, 1000000101, is employed, and when the previous-digit data of the first-digit data of the K1 code is 1, the K1 code of which the first-digit data is 0, namely, 0111111010, is employed. Thus, effective recognition of the first identification code may be guaranteed. Exemplarily, in Table 1. K1 is used for indicating start of transmission, K2 is used for indicating transmission cutoff, K3 is used for indicating a cutoff position of a row signal and may further be used for instructing a linear feedback register to perform a reset operation, and K4 is used for indicating end of transmission.

Figure 8:
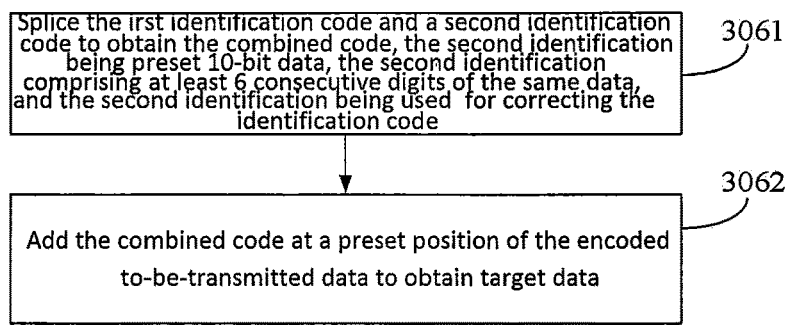
FIG. 8 is a flow diagram of adding a first identification code in front of encoded to-be-transmitted data to obtain target data shown according to an exemplary embodiment.

For example, when the first identification code is used for indicating start of transmission, the first identification code may be added in front of the to-be-transmitted data directly, or also may be added in front of the to-be-transmitted data in the form of a combined code. Exemplarily, as shown in FIG. 8, when the first identification code is added in front of the to-be-transmitted data in the form of a combined code, a procedure of adding the first identification code in front of the encoded to-be-transmitted data to obtain the target data may include the following steps.

At step 3061, the first identification code and a second identification code are spliced to obtain the combined code, the second identification code being preset 10-bit data, the second identification code comprising at least 6 consecutive digits of the same data, and the second identification code being different from the first identification code.

In an embodiment of the disclosure, the combined code may include at least one first identification code and at least one second identification code. The numerical value of a first identification code at a different position in one and the same combined code may be different, for example, the first identification codes in the combined code include different K1s in Table 1. Likewise, the numerical value of a second identification code at a different position may be different. The sending end and the receiving end may agree on the arrangement mode of the combined code in advance, and record this by employing a combined code table. In some embodiments, when there is at least one identification code which is transmitted correctly in the combined code, the receiving end may recover the correct combined code by querying the combined code table. For example, the first identification code is K1, the second identification code is G1, and then the combined code may be K1G1G1K1, and when K is transmitted erroneously, the receiving end may recover K1G1G1K1 by querying the table according to G1.

Exemplarily, the second identification code may be denoted as G, and G may be in four forms: G1, G2, G3, and G4, of which specific code values may refer to Table 2, in which 0b represents binary.

TABLE 2

| G1 | 0b0101010111 | 0b1010101000 |
| G2 | 0b0100011111 | 0b1011100000 |
| G3 | 0b0110001111 | 0b1001110000 |
| G4 | 0b0111000111 | 0b1000111000 |

Exemplarily, assume that the combined code is obtained by combining the first identification code K and the second identification code G in the form of KGKG, and then the combined code table may refer to Table 3. Assume that the received combined code is successively arranged 0111111010, 1010101000, 1000000101, and 1111111111. By employing the combined code to query the combined code table as shown in Table 3, it may be found that all the first 3 10-bit data of the combined code are the same as the first 3 10-bit data in the combined code in the first row in Table 3, and therefore, it may be determined that the correct combined code is successively arranged 0111111010, 1010101000, 1000000101, and 0101010111, and accordingly the first identification code that may be extracted is K1.

TABLE 3

| First identification code that may be extracted | Combined code | | | |
|---|---|---|---|---|
| | K | G | K | G |
| K1 | 0111111010 | 1010101000 | 1000000101 | 0101010111 |
| K2 | 0111111011 | 1011100000 | 1000000100 | 0100011111 |
| K3 | 0111111001 | 1001110000 | 1000000110 | 0110001111 |
| K4 | 0111111000 | 1000111000 | 1000000111 | 0111000111 |

At step 3062, the combined code is added at a preset position of the encoded to-be-transmitted data to obtain target data.

In an embodiment, the preset position is determined according to the content indicated by the first identification code. For example, when the first identification code indicates start of transmission, the preset position is a position in front of the to-be-transmitted data, that is, in front of the first-digit data of the first set of 10-bit data; when the first identification code indicates end of transmission, the preset position is a position behind the to-be-transmitted data, that is, behind the last-digit data of the last set of 10-bit data of the to-be-transmitted data; and when the first identification code is used for identifying transmitted content, the preset position may be between two specified sets of 10-bit data of the to-be-transmitted data.

In an embodiment, at step 307, the target data is sent.

In the embodiments of the disclosure, when the sending end of data is a controller, the receiving end of data may be a source driver chip, and when the sending end of data is a source driver chip, the receiving end of data may be a controller. Exemplarily, referring to FIG. 1, the controller may send the target data to a corresponding source driver chip by a first signal line (e.g., high speed differential signal line) or the second signal line, which will not be limited by the embodiments of the disclosure.

In an embodiment of the disclosure, after the to-be-transmitted data is encoded, the encoded to-be-transmitted data may be sent to the decoding end. The steps 306 and 307 are schematically illustrated just taking as an example that the encoded to-be-transmitted data is processed to obtain the target data and then transmitted to the decoding end. In a practical implementation, other processing or no processing may be performed on the encoded to-be-transmitted data, which will not be limited by the embodiment of the disclosure.

It is noted that, the order of the steps of the encoding method provided by the embodiments of the disclosure may be appropriately adjusted, and the steps may also be increased or decreased accordingly according to the situation. Variations of the method easily occurring to any skilled person familiar with the technical field within the technical scope disclosed by the invention should all be encompassed within the protective scope of the invention, and therefore will not be repeated any longer.

For the encoding method provided by the embodiments of the disclosure, at the time of data encoding, 8-bit data is encoded into alternative 10-bit data first, then based on the tenth-digit data in the alternative 10-bit data, it is determined whether an inversion operation is performed on the alternative 10-bit data to obtain ultimate target 10-bit data, thus a jumping edge is arranged between every two adjacent 10-bit data, and based on the tenth-digit data, it may be determined whether the target 10-bit data is data obtained by the inversion operation, which can effectively ensure that the to-be-transmitted data can be correctly recovered at a receiving end, and the jumping edge may effectively reduce transmission errors.

It is noted that, in the current field of timing control, there are usually two approaches for signal transmission, PLL and DLL, wherein the PLL is more common, and the DLL requires that a jumping edge needs to occur in a transmission procedure. However, since it can be ensured that a jumping edge occurs between two adjacent encoded bytes (that is, two adjacent sets of 10-bit data), the above described encoding method may effectively reduce the probability of incorrect transmission, and meet the requirements of the PLL and the DLL, such that the receiving end can support the signal transmission approaches of the PLL and the DLL simultaneously.

In a practical application, the less the consecutive and identical data in the transmitted data, the better the jitter performance is. Since the 8b/10b encoding algorithm provided by the step 301 may ensure that at least one of any 5 consecutive digits of the 10-bit data is different from the other digits, as compared to the conventional encoding method, it can reduce the amount of consecutive and identical data in every 10-bit data (i.e., each encoded byte), may ensure the encoded data has a better jitter performance in a subsequent transmission procedure, and thereby lower the probability of transmission errors.

Figure 9:
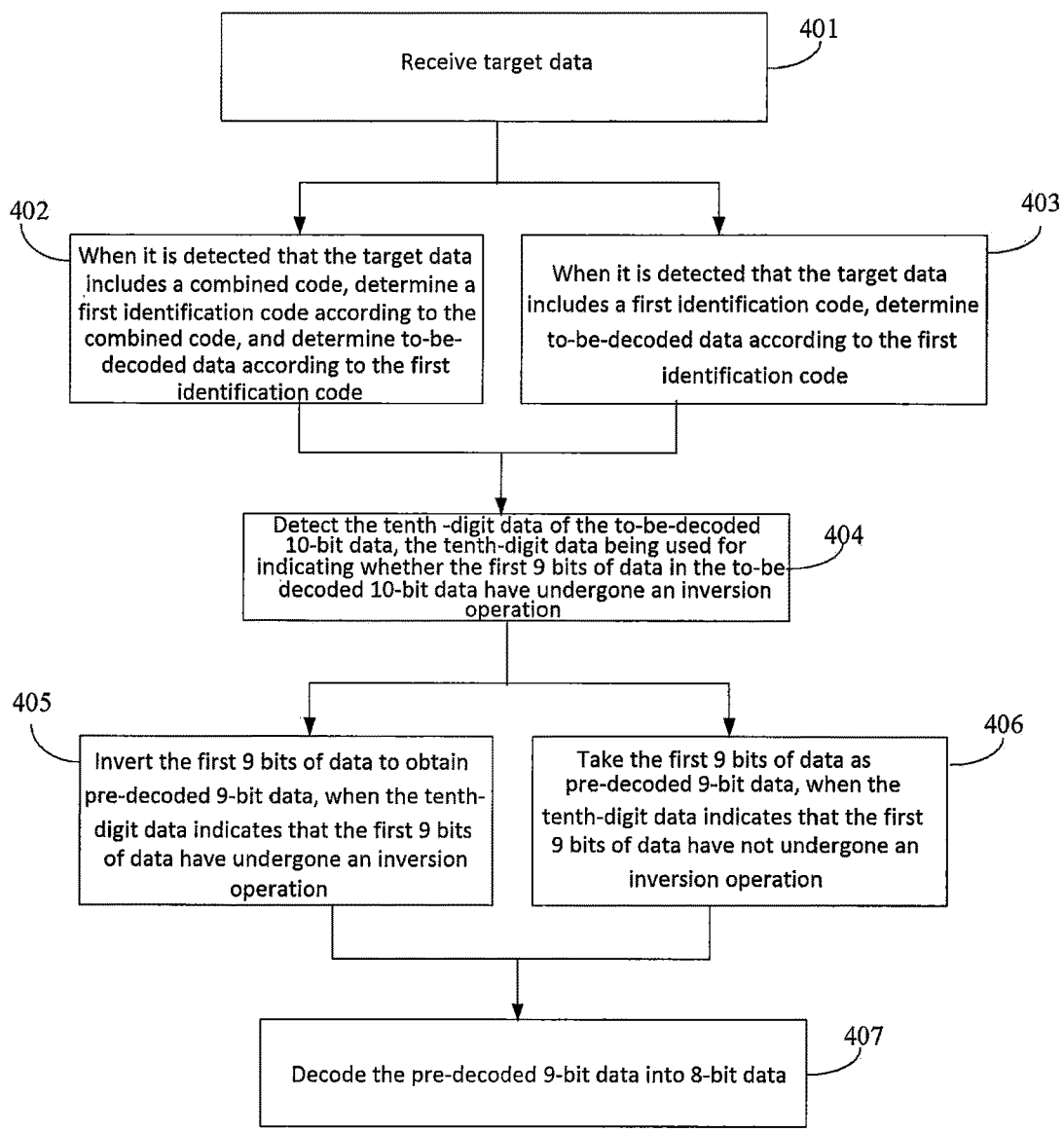
FIG. 9 is a flow diagram of a decoding method shown according to an exemplary embodiment.

Referring to the step 301, since the relationship between respective data of the finally obtained 10-bit data keeps unchanged no matter whether an inversion operation has been performed on to-be-decode 10-bit data at the decoding end, to be adapted to a decoding method in the related art, in an embodiment of the disclosure, it is assumed that specified-digit data in the to-be-decoded 10-bit data is an indication digit for indicating whether to invert, and there is provided a decoding method, which corresponds to the encoding method provided by FIG. 3 in the embodiment of the disclosure. As shown in FIG. 9, the method may be applied in an environment as shown in FIG. 1, assume that the specified-digit data is the tenth-digit data, and the method includes the following steps.

At step 401, target data is received.

The target data includes at least one set of 10-bit data, which is binary data. In an embodiment, the target data generally includes at least two sets of 10-bit data, wherein a first identification code may be included, and the first identification code may identify transmitted content, start of transmission or end of transmission, to facilitate better recognition of to-be-decoded data.

In an embodiment of the disclosure, when the sending end of data is a controller, the receiving end of data may be a source driver chip, and when the sending end of data is a source driver chip, the receiving end of data may be a controller. Exemplarily, as shown in FIG. 1, the source driver chip may send the target data to a corresponding controller via a first signal line (e.g., a high speed differential signal line) or the second signal line, which will not be limited by the embodiment of the disclosure.

At step 402, when it is detected that the target data includes a combined code, a first identification code is determined according to the combined code, and to-be-decoded data is determined according to the first identification code.

In an embodiment of the disclosure, the combined code is obtained by splicing the first identification code and a second identification code; the first identification code is preset 10-bit data, and the first identification code includes at least 6 consecutive digits of the same data; the second identification code is also preset 10-bit data, and the second identification code also includes at least 6 consecutive digits of the same data; and the second identification code is different from the first identification code.

The combined code may include at least one first identification code and at least one second identification code, and the numerical value of a first identification code at a different position in the same combined code may be different. For example, the first identification codes in the combined code include different K1 in table 1. Similarly, the numerical value of a second identification code at a different position may be different. The sending end and the receiving end may pre-agree on an arrangement way of a combined code, and employ a form of a combined code table for record. In some embodiments, when there is at least one identification code in a combined code which is correctly transmitted, the receiving end may recover the correct combined code by querying the combined code table.

When it is detected that the target data includes a combined code, the receiving end may determine a first identification code according to the combined code, and then determine to-be-decoded data according to the first identification code. In particular, the receiving end may query a combined code table according to the combined code, and when there is at least one identification code in the combined code which may be queried in the combined code table, which shows there is at least one identification code transmitted correctly in the combined code, the correct combined code may be recovered by querying the table, and then a first identification code is extracted from a preset position of the combined code, to determine to-be-decoded data.

It is noted that, when any of the identification codes in the combined code cannot be queried in the combined code table, it shows that the combined code is incorrect and the corresponding to-be-decoded data is also transmitted incorrectly, which may not be processed subsequently.

Since the first identification is used for identifying transmitted content, start of transmission or end of transmission, the position of a specific first identification code in the target data is determined according to the first identification code, and then the to-be-decoded data is determined according to the first identification code and its position.

In an embodiment of the disclosure, the first identification code is carried in the form of a combined code, which may improve the accuracy of decoding the first identification code.

At step 403, when it is detected that the target data includes a first identification code, to-be-decoded data is determined according to the first identification code.

The to-be-decoded data includes at least one set of to-be-decoded 10-bit data, the first identification code is preset 10-bit data, and the first identification code includes at least 6 consecutive digits of identical data.

Since a first identification code is used for identifying transmitted content, start of transmission or end of transmission, it may be possible to determine the position of a specific first identification code in the target data according to the first identification code, and then determine the to-be-decoded data according to the first identification code and its position. Here, reference may be made to the relevant content at the step 402.

At step 404, the tenth-digit data of the to-be-decoded 10-bit data is detected, the tenth-digit data being used for indicating whether the first 9 bits of data in the to-be-decoded 10-bit data have undergone an inversion operation.

In an embodiment of the disclosure, assume that when the tenth-digit data of the to-be-decoded 10-bit data is a first numerical value, it is indicated that the target 10-bit data is determined by performing an inversion operation on the to-be-decoded 10-bit data, that is, it may be considered that the first 9 bits of data of the to-be-decoded 10-bit data have undergone an inversion operation, and when the tenth-digit data in the to-be-decoded 10-bit data is not the first numerical value, it is indicated that the target 10-bit data is not determined by performing an inversion operation on the to-be-decoded 10-bit data, that is, it may be considered that the first 9 bits of data of the to-be-decoded 10-bit data have not undergone an inversion operation.

At step 405, the first 9 bits of data are inverted to obtain pre-decoded 9-bit data, when the tenth-digit data indicates that the first 9 bits of data have undergone an inversion operation.

Exemplarily, assume that when the tenth-digit data is 1, it may indicate that the 9 bits of data have undergone an inversion operation, and when the tenth-digit data is 0, it may indicate that the 9 bits of data have not undergone an inversion operation. Assume that the to-be-decoded 10-bit data is 1110011101. Its tenth digit is 1, showing that the first 9 bits of data 110011101 have undergone an inversion operation, and the first 9 bits of data 110011101 are inverted to obtain pre-decoded 9-bit data 001100010.

At step 406, the first 9 bits of data are taken as pre-decoded 9-bit data, when the tenth-digit data indicates that the first 9 bits of data have not undergone an inversion operation.

Exemplarily, assume that when the tenth-digit data is 1, it may indicate that the 9 bits of data have undergone an inversion operation, and when the tenth-digit data is 0, it may indicate that the 9 bits of data have not undergone an inversion operation. Assume that the to-be-decoded 10-bit data is 0001100010. Its tenth digit is 0, showing that the first 9 bits of data 001100010 have not undergone an inversion operation, and the first 9 bits of data 001100010 are taken as pre-decoded 9-bit data 001100010.

At step 407, the pre-decoded 9-bit data is decoded into 8-bit data.

At least one of any 5 consecutive digits of the pre-decoded 9-bit data is different from the other digits, that is, 5 consecutive 0s or 5 consecutive 1s will not appear in the 9-bit data. Decoding the pre-decoded 9-bit data into 8-bit data includes decoding the pre-decoded 9-bit data into the 8-bit data as follows:

$D\text{out}[7]=d\_code[8];$ $D\text{out}[6]=d\_code[4];$ $D\text{out}[5]=d\_code[3];$ $D\text{out}[4]=d\_code[7];$ $D\text{out}[3]=d\_code[0];$ $D\text{out}[2]=(d\_code[6]\textasciicircum d\_code[5])\&\sim(\sim d\_code[2]\&d\_code[1]);$ Dout[1]=(d_code[6]^d_code[5])&~
(~d_code[2]&~d_code[1]);

Dout[0]=(d_code[6]&~d_code[5])|
(d_code[6]&d_code[5]&d_code[2])|
(~d_code[6]&~d_code[5]&d_code[2]);

wherein d_code[i] is the (i+1)-th digit data in the 9-bit data, 8≥i≥0, and i is an integer; Dout[j] is the (j+1)-th digit data in the 8-bit data, 7≥j≥0, and j is an integer; and ^ represents performing an exclusive OR operation, ~ represents performing an inversion operation, & represents performing an AND operation, and | represents performing an OR operation. Therein, explanation of the inversion operation, the AND operation, the OR operation and the exclusive OR operation may be referred to the description with respect to the step 301.

Figure 10:
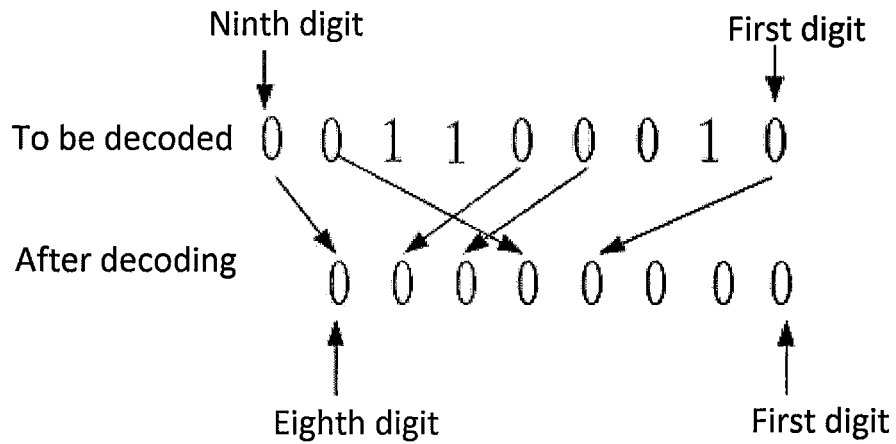
FIG. 10 is a schematic diagram of a 9b/8b decoding approach shown according to an exemplary embodiment.

Exemplarily, as shown in FIG. 10, assume that the pre-decoded 9-bit data is 001100010, and its first-digit data to the ninth-digit data is successively 0, 0, 1, 1, 0, 0, 0, 1, 0. Then, it may be decoded into 8-bit data 00000000 according to the above decoding approach, wherein in the 8-bit data, the eighth-digit data Dout[7]=d_code[8]=0;

the seventh-digit data Dout[6]=d_code[4]=0;

the sixth-digit data Dout[5]=d_code[3]=0;

the fifth-digit data Dout[4]=d_code[7]=0;

the fourth-digit data Dout[3]=d_code[0]=0;

the third-digit data Dout[2]= (d_code[6]^d_code[5])&~(~d_code[2]&d_code[1])=(1^0 1)&~(~0&1)=0 1 &~(1&1)=0 1 &~1=0 1 &0=0;

the second-digit data Dout[1]= (d_code[6]^d_code[5])&~(d_code[2]&~d_code[1])=(1^1)&~(0&~1)=0&(~0&0)=0&~0=0&1=0;

the first-digit data Dout[0]=(d_code[6]&~d_code[5])| (d_code[6]&d_code[5]&d_code[2])| (~d_code[6]&~d_code[5]&d_code[2])=(1&~1)| (1&1&0)|(~1&~1&0)=(1&0)|0| (0&0&0)=0|0|0=0.

It is noted that, the order of the steps of the decoding method provided by the individual embodiments of the disclosure may be appropriately adjusted, and the steps may also be increased or decreased accordingly according to the situation. For example, the steps 404 to 406 may not be performed, and it may be possible to take the first 9 bits of data as the pre-decoded 9-bit data directly after the step 403. Variations of the method easily occurring to any skilled person familiar with the technical field within the technical scope disclosed by the disclosure should all be encompassed within the protective scope of the invention, and therefore will not be repeated any longer.

Moreover, the above decoding method is just illustrated taking that the tenth-digit data is the specified-digit data as an example. In a practical application, the specified-digit data may also be other-digit data, and the corresponding decoding method may be simply changed referring to the above embodiment, which will not be repeated by the embodiment of the disclosure any longer.

For the decoding method provided by the individual embodiments of the disclosure, at the time of data decoding, the 10-bit data is decoded into 9-bit data according to the tenth-digit data first, and then the 9-bit data is decoded into 8-bit data, which can effectively ensure that the transmitted data can be correctly recovered at a receiving end, and the jumping edge may effectively reduce transmission errors, such that the receiving end can support the clock transmission approaches of the PLL and the DLL simultaneously by the above decoding approach.

Figure 11:
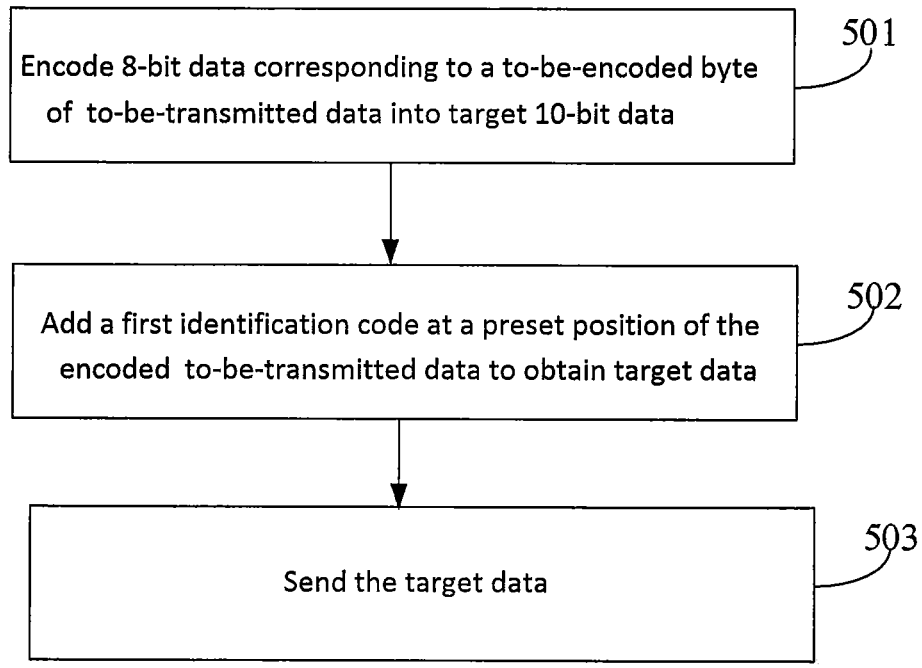
FIG. 11 is a flow diagram of still another encoding method shown according to an exemplary embodiment.

An embodiment of the disclosure provides an encoding method. As shown in FIG. 11, the method may be applied in an environment as shown in FIG. 1, and the method includes the following steps.

At step 501, 8-bit data corresponding to a to-be-encoded byte of to-be-transmitted data is encoded into target 10-bit data, the to-be-transmitted data comprising at least one to-be-encoded byte.

An encoding procedure of the step 501 may refer to the procedure of encoding 8-bit data corresponding to a to-be-encoded byte of to-be-transmitted data into alternative 10-bit data at the step 301, which will not be repeated by the embodiment of the disclosure any longer.

At step 502, a first identification code is added at a preset position of the encoded to-be-transmitted data to obtain target data.

The step 502 may refer to the step 306.

At step 503, the target data is sent.

The step 503 may refer to the step 307.

In an embodiment of the disclosure, after the to-be-transmitted data is encoded, the encoded to-be-transmitted data may be sent to a decoding end. The steps 502 and 503 are schematically illustrated just taking as an example that the encoded to-be-transmitted data is processed to obtain the target data and then transmitted to the decoding end. In a practical implementation, other processing or no processing may be performed on the encoded to-be-transmitted data, which will not be limited by the embodiment of the disclosure.

The encoding method provided by the embodiment of the disclosure employs the above approach to encode 8-bit data into target 10-bit data, wherein there is at least one digit different from other digits in any consecutive five digits in the obtained target 10-bit data, which, as compared to the conventional encoding method, can reduce the amount of consecutive and identical data in every 10-bit data (i.e., each encoded byte), may ensure the encoded data has a better jitter performance in a subsequent transmission procedure, and thereby lower the probability of transmission errors.

Figure 12:
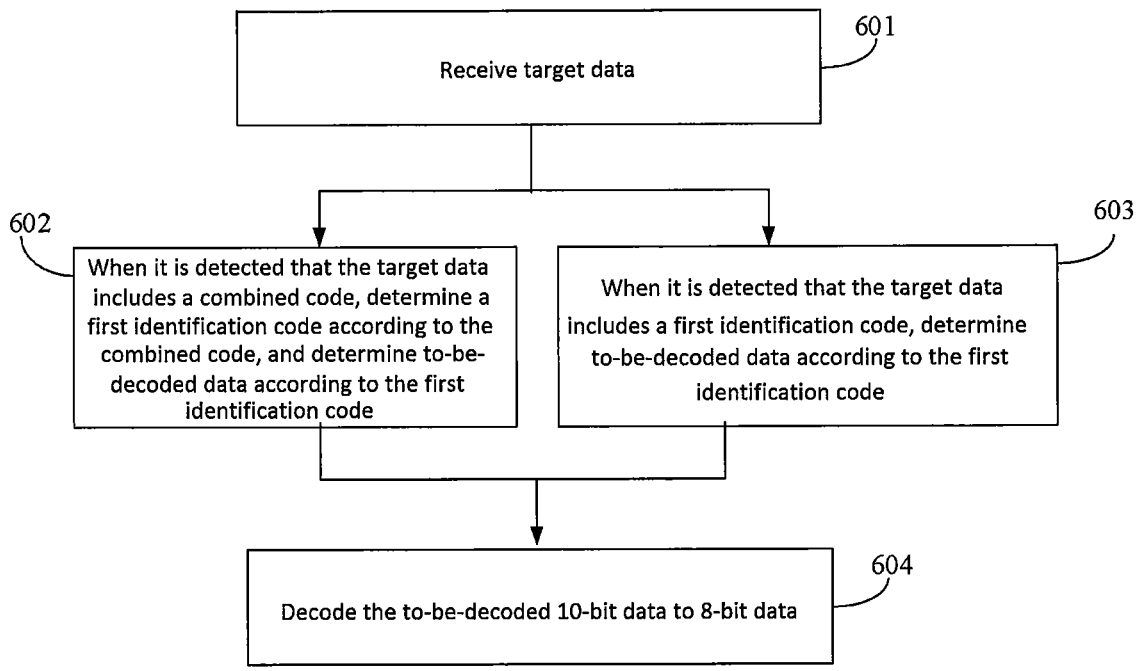
FIG. 12 is a flow diagram of another decoding method shown according to an exemplary embodiment.

An embodiment of the disclosure provides a decoding method, which corresponds to the encoding method provided by FIG. 11 in the embodiment of the disclosure. As shown in FIG. 12, the method may be applied in an environment as shown in FIG. 1, and the method includes the following steps.

At step 601, target data is received.

The step 601 may refer to the step 401.

At step 602, when it is detected that the target data includes a combined code, a first identification code is determined according to the combined code, and to-be-decoded data is determined according to the first identification code.

The step 602 may refer to the step 402.

At step 603, when it is detected that the target data includes a first identification code, to-be-decoded data is determined according to the first identification code.

The step 603 may refer to the step 403.

At step 604, the to-be-decoded 10-bit data is decoded to 8-bit data.

In the embodiment of the disclosure, since steps such as the steps 302 to 305 are not performed at the encoding end, it is unnecessary to perform actions of 404 to 406 at the decoding end. At the decoding end, it may be possible to delete the tenth-digit data of the to-be-decoded 10-bit data to obtain pre-decoded 9-bit data, and then decode the pre-decoded 9-bit data to 8-bit data. This procedure may refer to the step 407.

Of course, the decoding end may further adopt other decoding approaches, for example, a decoding procedure at the decoding end employs a reverse procedure of the step 501 directly, which will not be repeated by the embodiment of the disclosure.

The decoding method provided by the embodiment of the disclosure may effectively implement the decoding of the encoded data.

Figure 13:
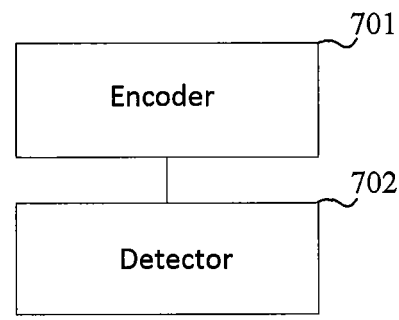
FIG. 13 is a structural schematic diagram of an encoding apparatus shown according to an exemplary embodiment.

An embodiment of the disclosure provides an encoding apparatus, and as shown in FIG. 13, the apparatus includes:

an encoder 701 for encoding 8-bit data corresponding to a to-be-encoded byte of to-be-transmitted data into alternative 10-bit data, the to-be-transmitted data comprising at least one to-be-encoded byte;

a detector 702 for detecting whether the first-digit data of the alternative 10-bit data is the same as the previous-digit data adjacent to the first-digit data, when the to-be-encoded byte is not the first byte of the to-be-transmitted data; and the encoder 701 being further used for:

inverting the alternative 10-bit data to obtain target 10-bit data, when the numerical value of the first-digit data is the same as that of the previous-digit data; and determining the alternative 10-bit data as the target 10-bit data, when the numerical value of the first-digit data is different from that of the previous-digit data;

wherein all the data is binary data.

For the encoding apparatus provided by the embodiment of the disclosure, at the time of data encoding, the encoder encodes 8-bit data into alternative 10-bit data first, and then arranges a jumping edge between every two adjacent 10-bit data, which jumping edge may effectively reduce transmission errors. Moreover, the encoding approach as described above meets the requirements of the PLL and the DLL, such that a receiving end can support the signal transmission approaches of the PLL and the DLL simultaneously.

In an embodiment, the alternative 10-bit data satisfies:

$$enc[k1]=\sim din[m];$$

$$enc[k2]=\sim din[m]\char`\^F;$$

wherein enc[k1] is specified-digit data in the alternative 10-bit data, enc[k2] is data in the alternative 10-bit data other than the specified-digit data, din[m] is specified-digit data in the 8-bit data, F is data determined based on at least one of other digit data in the 8-bit data, ~ represents performing an inversion operation, and ^ represents performing an exclusive OR operation.

In an embodiment, the encoder 701 is used for:

encoding the 8-bit data into the alternative 10-bit data as follows:

$$enc[9]=\sim din[3];$$

$$enc[8]=\sim din[3]\char`\^din[7];$$

$$enc[7]=\sim din[3]\char`\^din[4];$$

$$enc[6]=\sim din[3]\char`\^((\sim din[2]\&\sim din[1]\&\sim din[4])|(din[2]\&din[0])|(din[1]\&din[0]));$$

$$enc[5]=\sim din[3]\char`\^((\sim din[2]\&\sim din[1]\&\sim din[4])|(din[2]\&\sim din[0])|(din[1]\&\sim din[0]));$$

$$enc[4]=\sim din[3]\char`\^din[6];$$

$$enc[3]=\sim din[3]\char`\^din[5];$$

$$enc[2]=\sim din[3]\char`\^((din[2]\&\sim din[1])|(din[2]\&din[1]\&\sim din[3])|(\sim din[1]\&din[0]));$$

$$enc[1]=\sim din[3]\char`\^((\sim din[2]\&din[1])|(din[2]\&din[1]\&\sim din[3])|(\sim din[2]\&\sim din[0]));$$

$$enc[0]=\sim din[3]\char`\^din[3];$$

wherein enc[i] is the (i+1)-th digit data in the alternative 10-bit data, 9≥i≥0, and i is an integer; din[j] is the (j+1)-th digit data in the 8-bit data, 7≥j≥0, and j is an integer; and & represents performing an AND operation, and | represents performing an OR operation.

In an embodiment, the first-digit data of the alternative 10-bit data is a first numerical value, the detector 702 is used for:

detecting whether the previous-digit data is the first numerical value;

determining that the first-digit data is the same as the previous-digit data when the previous-digit data is the first numerical value; and determining that the first-digit data is different from the previous-digit data when the previous-digit data is not the first numerical value.

Figure 14:
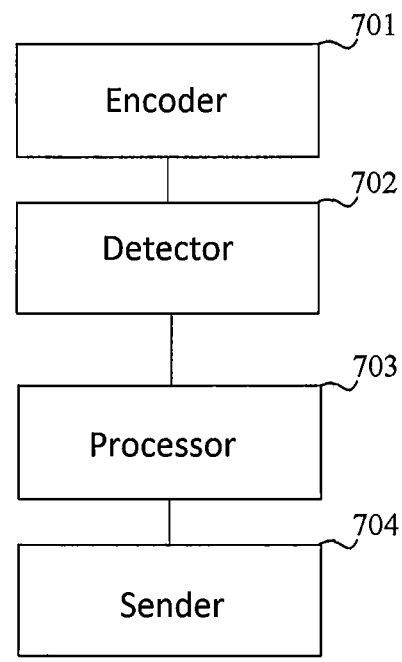
FIG. 14 is a structural schematic diagram of another encoding apparatus shown according to an exemplary embodiment.

Further, as shown in FIG. 14, the encoding apparatus further includes:

a processor for adding a first identification code at a preset position of the encoded to-be-transmitted data to obtain target data, the first identification code being preset 10-bit data, the first identification code comprising at least 6 consecutive digits of the same data, the first identification code being used for identifying transmitted content, start of transmission or end of transmission, and the encoded to-be-transmitted data comprising the target 10-bit data obtained by encoding the 8-bit data corresponding to the to-be-encoded byte;

and In an embodiment, a sending module 704 for sending the target data.

In an embodiment, the processor 703 is used for:

splicing the first identification code and a second identification code to obtain a combined code, the second identification code being also preset 10-bit data, the second identification code also comprising at least 6 consecutive digits of the same data, and the second identification code being different from the first identification code; and adding the combined code at a preset position of the encoded to-be-transmitted data to obtain the target data.

For explanation of the first identification code, the second identification code, the combined identification code and other relevant features, it may further refer to the description in connection with FIG. 3 and FIG. 4.

For the encoding apparatus provided by the embodiments of the disclosure, at the time of data encoding, 8-bit data is encoded into alternative 10-bit data first, then based on the tenth-digit data in the alternative 10-bit data, it is determined whether an inversion operation is performed on the alternative 10-bit data to obtain ultimate target 10-bit data, thus a jumping edge is arranged between every two adjacent 10-bit data, and based on the tenth-digit data, it may be determined whether the target 10-bit data is data obtained by the inversion operation, which can effectively ensure that the to-be-transmitted data can be correctly recovered at a receiving end, and the jumping edge may effectively reduce transmission errors.

It is noted that, in the current field of timing control, there are usually two approaches for signal transmission, PLL and DLL, wherein the PLL is more common, and the DLL requires that a jumping edge needs to occur in a transmission procedure. However, since it can be ensured that a jumping edge occurs between two adjacent encoded bytes (that is, two adjacent sets of 10-bit data), the above described encoding method may effectively reduce the probability of incorrect transmission, and meet the requirements of the PLL and the DLL, such that the receiving end can support the signal transmission approaches of the PLL and the DLL simultaneously.

In a practical application, the less the consecutive and identical data in the transmitted data, the better the jitter performance is. Since the 8b/10b encoding algorithm provided by the step 301 may ensure that at least one of any 5 consecutive digits of the 10-bit data is different from the other digits, as compared to the conventional encoding method, it can reduce the amount of consecutive and identical data in every 10-bit data (i.e., each encoded byte), may ensure the encoded data has a better jitter performance in a subsequent transmission procedure, and thereby lower the probability of transmission errors.

An embodiment of the disclosure provides an encoding apparatus comprising: an encoder for encoding 8-bit data corresponding to a to-be-encoded byte of to-be-transmitted data into target 10-bit data as follows:

$enc[9] = \sim din[3]$;

$enc[8] = \sim din[3]\hat{\ }din[7]$;

$enc[7] = \sim din[3]\hat{\ }din[4]$;

$enc[6] = \sim din[3]\hat{\ }((\sim din[2]\&\sim din[1]\&\sim din[4])|(din[2]\&din[0])|(din[1]\&din[0]))$;

$enc[5] = \sim din[3]\hat{\ }((\sim din[2]\&\sim din[1]\&\sim din[4])|(din[2]\&\sim din[0])|(din[1]\&\sim din[0]))$;

$enc[4] = \sim din[3]\hat{\ }din[6]$;

$enc[3] = \sim din[3]\hat{\ }din[5]$;

$enc[2] = \sim din[3]\hat{\ }((din[2]\&\sim din[1])|(din[2]\&din[1]\&\sim din[3])|(\sim din[1]\&din[0]))$;

$enc[1] = \sim din[3]\hat{\ }((\sim din[2]\&din[1])|(din[2]\&din[1]\&\sim din[3])|(\sim din[2]\&\sim din[0]))$;

$enc[0] = \sim din[3]\hat{\ }din[3]$;

wherein enc[i] is the (i+1)-th digit data in the 10-bit data, 9≥i≥0, and i is an integer; din[j] is the (+1)-th digit data in the 8-bit data, 7≥≥0, and j is an integer; and ~ represents performing an inversion operation, & represents performing an AND operation, | represents performing an OR operation, ^ represents performing an exclusive OR operation, and the target 10-bit data is binary data.

The encoding apparatus provided by the embodiment of the disclosure employs the above approach to encode 8-bit data into target 10-bit data, wherein there is at least one digit different from other digits in any consecutive five digits in the obtained target 10-bit data, which, as compared to the conventional encoding method, can reduce the amount of consecutive and identical data in every 10-bit data (i.e., each encoded byte), may ensure the encoded data has a better jitter performance in a subsequent transmission procedure, and thereby lower the probability of transmission errors.

An embodiment of the disclosure provides a display apparatus comprising:
a controller and a source driver chip comprising a controller and a plurality of source driver chips,
wherein the controller may include an encoding apparatus which may be an encoding apparatus as shown in FIG. 12 or FIG. 13, and the source driver chip may include a decoding apparatus which may perform a decoding method provided by the above embodiments of the disclosure,
or the controller may include a decoding apparatus which may perform a decoding method provided by the above embodiments of the disclosure, and the source driver chip may include an encoding apparatus which may be an encoding apparatus as shown in FIG. 12 or FIG. 13.

In a practical application, since two-way transmission may be conducted for data of the controller and the source driver chip, both the controller and the source driver chip may perform data encoding, and both the controller and each said source driver chip include an encoding apparatus provided by the embodiments of the disclosure.

The display apparatus is a liquid crystal display apparatus or an organic light emitting diode (OLED for short), and the controller is at least one of a timing controller, an SOC and an MCU. In an embodiment, the display apparatus may further be any product or component with the display function, such as electronic paper, a panel, a mobile phone, a tablet computer, a television, a notebook computer, a digital photo frame, a navigator, etc.

An embodiment of the disclosure provides an encoding apparatus comprising:
a processor; and
a memory for storing executable instructions of the processor;
wherein the processor is capable of implementing an encoding method provided by the embodiments of the disclosure.

An embodiment of the disclosure provides a non-transitory computer readable storage medium, and when instructions in the non-transitory computer readable storage medium are executed by a processor, the processor is enabled to perform an encoding method provided by the embodiments of the disclosure.

An embodiment of the disclosure provides a signal transmission system comprising: a controller and a source driver chip comprising a controller and a plurality of source driver chips, both the controller and each of the source driver chips comprising an encoding apparatus as described in any of the third aspect and the fourth aspect.

Figure 15:
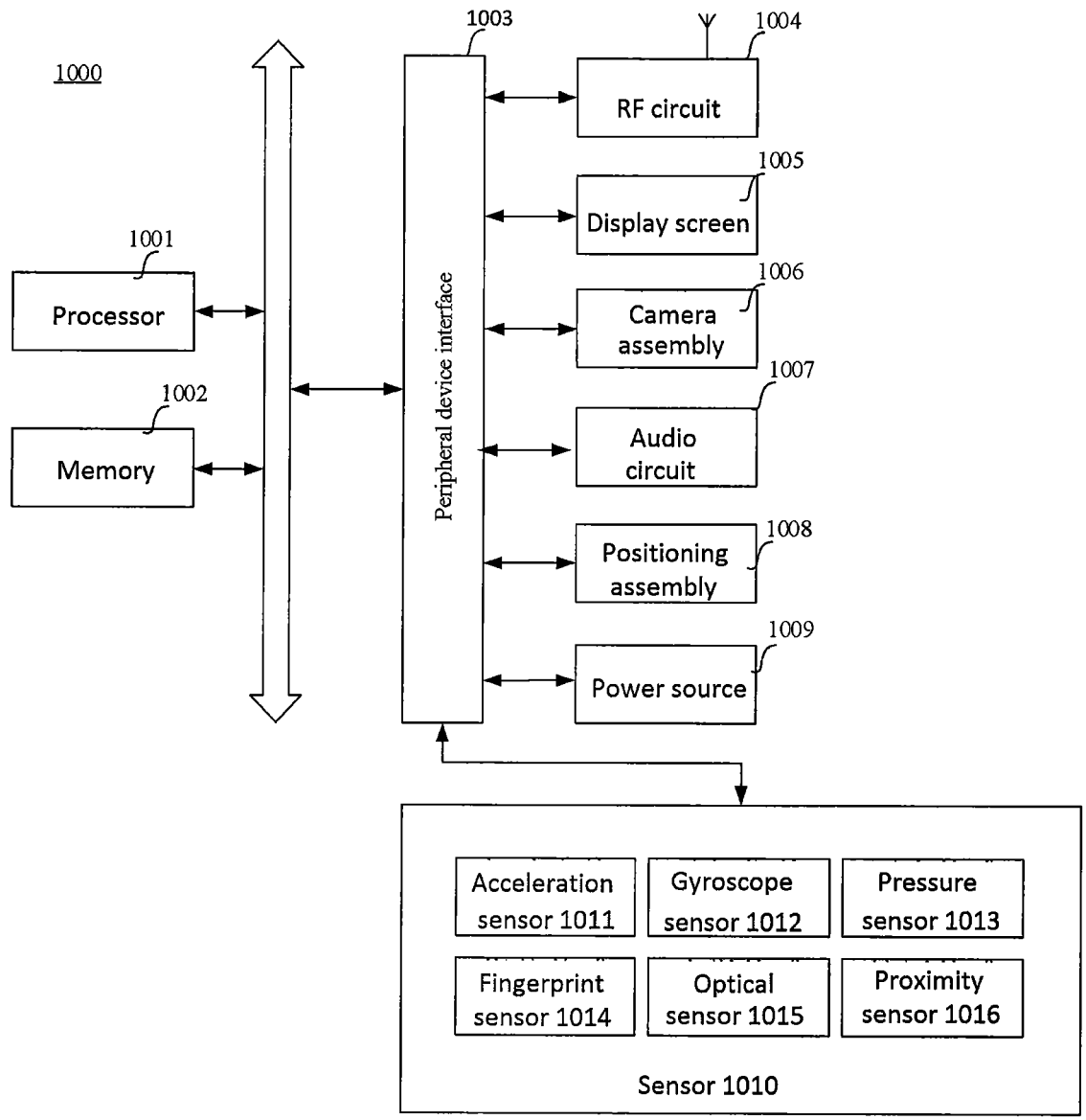
FIG. 15 is a structural schematic diagram of a display apparatus shown according to an exemplary embodiment.

FIG. 15 shows a structural schematic diagram of a display apparatus 1000 provided by an exemplary embodiment of the disclosure. The apparatus 1000 may be any product or component with the display function, such as a liquid crystal panel, electronic paper, an OLED panel, a mobile phone, a tablet computer, a television, a display, a notebook computer, a digital photo frame, a navigator, etc. The display apparatus includes a controller and a plurality of source driver chips, and the controller is at least one of a timing controller, an SOC and an MCU. In general, the apparatus 1000 further includes a processor 1001 and a memory 1002.

The processor 1001 may include one or more processing core, for example, 4-core processor, 8-core processor, etc. The processor 1001 may be implemented employing at least one hardware form of DSP (digital signal processing), FPGA (field programmable gate array) and PLA (programmable logic array). The processor 1001 may also include a main processor and a coprocessor, the main processor is a processor for processing data in a wake-up state, also called CPU (central processing unit), and the coprocessor is a low power processor for processing data in a standby state. In some embodiments, the processor 1001 may be integrated with a GPU (graphics processing unit), and the GPU is used for rendering and drawing content that is required by a display screen for display. In some embodiments, the processor 1001 may further include an AI (artificial intelligence) processor, which AI processor is used for processing computational operations related with machine learning.

The memory 1002 may include one or more computer readable storage medium, and the computer readable storage medium may be non-transitory. The memory 1002 may further include a high speed random access memory and a non-volatile memory, for example, one or more disk storage device, a flash storage device. In some embodiments, the non-transitory computer readable storage medium in the memory 1002 is used for storing at least one instruction, which is used for being processed by the processor 1001 to implement a data transmission method provided by the method embodiments in this application.

In some embodiments, the apparatus 1000 may further include a peripheral device interface 1003 and at least one peripheral device. The processor 1001, the memory 1002 and the peripheral device interface 1003 may be connected via a bus or a signal line(s). An individual peripheral device may be coupled to the peripheral device interface 1003 via the bus, a signal line or a circuit board. In particular, the peripheral device includes at least one of an RF circuit 1004, a display screen 1005, a camera 1006, an audio circuit 1007, a positioning assembly 1008 and a power source 1009.

The peripheral device interface 1003 may be used for connecting at least one peripheral device related with I/O (input/output) to the processor 1001 and the memory 1002. In some embodiments, the processor 1001, the memory 1002 and the peripheral device interface 1003 are integrated into one and the same chip or circuit board; and in some other embodiments, any one or two of the processor 1001, the memory 1002 and the peripheral device interface 1003 may be implemented in a separate chip or circuit board, which will not be limited by the embodiments.

The RF circuit 1004 is used for receiving and transmitting an RF (radio frequency) signal, also called an electromagnetic signal. The RF circuit 1004 communicates with a communication network and other communication devices through an electromagnetic signal. The RF circuit 1004 converts an electrical signal to an electromagnetic signal for sending, or converts a received electromagnetic signal to an electrical signal. In an embodiment, the RF circuit 1004 includes an antenna system, an RF transceiver, one or more amplifier, a tuner, an oscillator, a digital signal processor, a codec chipset, a user ID card, etc. The RF circuit 1004 may communicate with other apparatuses through at least one wireless communication protocol. The wireless communication protocol includes, but is not limited to, World Wide Web, Metropolitan Area Network, Intranet, each generation of mobile communication network (2G, 3G, 4G, and 5G), Wireless Local Area Network and/or WiFi (Wireless Fidelity) network. In some embodiments, the RF circuit 1004 may further include a circuit related with NFC (near field communication), which will not be limited by this application.

The display screen 1005 is used for displaying a UI (user interface). The UI may include graphics, a text, an icon, a video and any combination thereof. When the display screen 1005 is a touch display screen, the display screen 1005 is also capable of capturing a touch signal on or above the surface of the display screen 1005. The touch signal may be inputted to the processor 1001 as a control signal for processing. At this point, the display screen 1005 may further be used for providing a virtual button and/or virtual keyboard, also called a soft button and/or soft keyboard. In some embodiments, there may be one display screen 1005, which is arranged on the front panel of the apparatus 1000; in other embodiments, there may be at least two display screens 1005, which are arranged on different surfaces of the apparatus 1000 respectively or take on a folded design; and in still other embodiments, the display screen 1005 may be a flexible display screen, and arranged on a curved surface or folded surface of the apparatus 1000. Moreover, the display screen 1005 may further be set to a non-rectangular irregular pattern, namely, a special-shaped screen. The display screen 1005 may be manufactured employing a material such as LCD (liquid crystal display), OLED (organic light emitting diode), etc.

The camera assembly 1006 is used for capturing an image or video. In an embodiment, the camera assembly 1006 includes a front camera and a rear camera. Generally, the front camera is arranged on the front panel of the apparatus, and the rear camera is arranged on the back of the apparatus. In some embodiments, there are at least two rear cameras, which are any of a main camera, a depth-of-field camera, a wide-angle camera, and a telephoto camera, to achieve fusion of the main camera and the depth-of-field camera to realize the background blurring function, fusion of the main camera and the wide-angle camera to realize panoramic shooting and VR (virtual reality) shooting function or other fusion shooting functions. In some embodiments, the camera assembly 1006 may further include a flash. The flash may be a mono-color-temperature flash, or also may be a dual-color-temperature flash. The dual-color-temperature flash refers to a combination of a warm light flash and a cold light flash, and may be used for light compensation at different color temperatures.

The audio circuit 1007 may include a microphone and a speaker. The microphone is used for capturing sound waves of a user and the environment, and converting the sound waves to an electrical signal to be inputted to the processor 1001 for processing, or inputted to the RF circuit 1004 to achieve voice communication. For the purpose of stereo acquisition or noise reduction, there may be a plurality of microphones, which are arranged at different locations of the apparatus 1000, respectively. The microphone may further be an array microphone or an omnidirectional acquisition microphone. The speaker is used for converting an electrical signal from the processor 1001 or the RF circuit 1004 to sound waves. The speaker may be a conventional thin film speaker, or also may be a piezoelectric ceramic speaker. When the speaker is a piezoelectric ceramic speaker, it may not only convert an electrical signal to sound waves audible to humans, but also convert the electrical signal to sound waves inaudible to humans for ranging and other purposes. In some embodiments, the audio circuit 1007 may further include a headphone jack.

The positioning assembly 1008 is used for positioning the current geographic position of the apparatus 1000 to implement navigation or LBS (location based service). The positioning assembly 1008 may be one based on the GPS (Global Positioning System) of America, the Beidou system of China or the Galileo system of Russia.

The power source 1009 is used for powering individual components in the apparatus 1000. The power source 1009 may be an AC, DC, disposable battery or rechargeable battery. When the power source 1009 comprises a rechargeable battery, the rechargeable battery may be a wired rechargeable battery or a wireless rechargeable battery. The wired rechargeable battery is a battery charged by a wired line, and the wireless rechargeable battery is a battery charged by a wireless coil. The rechargeable battery may further be used for supporting the fast charging technology.

In some embodiments, the apparatus 1000 further includes one or more sensor 1010. The one or more sensor 1010 includes, but is not limited to, an acceleration sensor 1011, a gyroscope sensor 1012, a pressure sensor 1013, a fingerprint sensor 1014, an optical sensor 1015 and a proximity sensor 1016.

The acceleration sensor 1011 may detect accelerations on three coordinate axes of a coordinate system established according to the apparatus 1000. For example, the acceleration sensor 1011 may be used for detecting components on the three coordinate axes of the gravitational acceleration. The processor 1001 may control the touch display screen 1005 to conduct display of the user interface in a horizontal view or a vertical view, according to the gravitational acceleration signal captured by the acceleration sensor 1011. The acceleration sensor 1011 may further be used for collecting movement data of a user or a game.

The gyroscope sensor 1012 may detect the body direction and the rotation angle of the apparatus 1000, and the gyroscope sensor 1012 may cooperate with the acceleration sensor 1011 to capture a user's 3D action on the apparatus 1000. The processor 1001 may achieve the following functions according to the data captured by the gyroscope sensor 1012: motion sensing (for example, changing the UI according to the tilt operation of the user), image stabilization during shooting, game control and inertial navigation.

The pressure sensor 1013 may be arranged at a side frame of the apparatus 1000 and/or a lower layer of the touch display screen 1005. When the pressure sensor 1013 is arranged at a side frame of the apparatus 1000, it may detect a user's holding signal for the apparatus 1000, and the processor 1001 performs left or right hand recognition or shortcut operation according to the holding signal captured by the pressure sensor 1013. When the pressure sensor 1013 is arranged at a lower layer of the touch display screen 1005, the processor 1001 realizes control of an operable control on the UI interface according to a user's pressure operation on the touch display screen 1005. The operable control includes at least one of a button control, a scroll bar control, an icon control, and a menu control.

The fingerprint sensor 1014 is used for capturing a fingerprint of a user, and the processor 1001 identifies the identity of the user according to the fingerprint captured by the fingerprint sensor 1014, or the fingerprint sensor 1014 identifies the identity of the user according to the captured fingerprint. When the identity of the user is identified as a trusted identity, the processor 1001 authorizes the user to perform a related sensitive operation, which sensitive operation includes unlocking screen, viewing encrypted information, downloading software, paying and changing settings, etc. The fingerprint sensor 1014 may be arranged on the front, back or side of the apparatus 1000. When the apparatus 1000 is arranged with a physical button or manufacturer's Logo, the fingerprint sensor 1014 may be integrated with the physical button or manufacturer's Logo.

The optical sensor 1015 is used for capturing ambient light intensity. In an embodiment, the processor 1001 may control the display brightness of the touch display screen 1005 according to the ambient light intensity captured by the optical sensor 1015. In particular, when the ambient light intensity is high, the display brightness of the touch display screen 1005 is increased; and when the ambient light intensity is low, the display brightness of the touch display screen 1005 is decreased. In a further embodiment, the processor 1001 may further dynamically adjust a shooting parameter of the camera assembly 1006 according to the ambient light intensity captured by the optical sensor 1015.

The proximity sensor 1016, also called a distance sensor, is generally arranged at the front panel of the apparatus 1000. The proximity sensor 1016 is used for capturing the distance between the user and the front of the apparatus 1000. In an embodiment, when the proximity sensor 1016 detects that the distance between the user and the front of the apparatus 1000 decreases gradually, the processor 1001 controls the touch display screen 1005 to switch from a bright-screen state to an turnoff-screen state; and when the proximity sensor 1016 detects that the distance between the user and the front of the apparatus 1000 increases gradually, the processor 1001 controls the touch display screen 1005 to switch from the turnoff-screen state to the bright-screen state.

It may be appreciated by the person having ordinary skills in the art that, the structure shown in FIG. 15 does not constitute a limitation to the apparatus 1000, may include more or less components than the figure, or combine some components, or employ a different component arrangement.

An embodiment of the disclosure provides a chip, and the chip includes a programmable logic circuit and/or a program instruction, which is used for implementing an encoding method provided by the embodiments of the disclosure when the chip runs.

An embodiment of the disclosure provides a computer program product, and in the computer program product is stored an instruction, which causes a computer to perform an encoding method provided by the embodiments of the disclosure when it runs on the computer.

For the apparatuses in the above embodiments, specific approaches for performing operations by their respective components have been described in detail in relevant method embodiments, which will not be elucidated here. Moreover, in the individual embodiments of the disclosure, "/" may represent conversion, for example, 8b/10b represents converting 8-bit data into 10-bit data.

In this text, various techniques may be described in the general context of software, hardware, element or program modules. In general, these modules include routines, programs, objects, elements, components, data structures, etc. for performing specific tasks or implementing specific abstract data types. The terms "module", "function" and "component", etc. used in this text generally represent software, firmware, hardware or a combination thereof. Features of the techniques described in this text are independent of a platform, which means that the techniques may be realized on various computing platforms with various processors.

Other implementation schemes of this application will easily occur to the person having skills in the art after considering the specification and practicing the invention disclosed herein. This application aims at covering any variations, uses or adaptations of this application, and these variations, uses or adaptations follow the general principles of this application and include common sense or common technical means in the art which is not disclosed by this application. The specification and the embodiments are simply deemed as exemplary, and the true scope and spirit of this application are pointed out by the claims.

It should be understood that, this application is not limited to the precise structures described above and shown in the drawings, and various modifications and changes may be made without departing from its scope. The scope of this application is only limited by the appended claims.

What is claimed is:

1. An encoding method, comprising:
   encoding 8-bit data corresponding to a to-be-encoded byte of to-be-transmitted data into alternative 10-bit data, the to-be-transmitted data comprising at least one to-be-encoded byte;
   detecting whether a first-digit data of the alternative 10-bit data is same as previous-digit data adjacent to the first-digit data, when the to-be-encoded byte is not a first byte of the to-be-transmitted data;
   inverting the alternative 10-bit data to obtain target 10-bit data, when a numerical value of the first-digit data is same as the previous-digit data; and
   determining the alternative 10-bit data as the target 10-bit data, when the numerical value of the first-digit data is different from the previous-digit data;
   wherein the 8-bit data, the alternative 10-bit data and the target 10-bit data are binary data.

2. The method as claimed in claim 1, wherein, the alternative 10-bit data satisfies:

$enc[k1]=\sim din[m]$; and $enc[k2]=\sim din[m]\hat{\ }F$, and wherein enc[k1] is specified-digit data in the alternative 10-bit data, enc[k2] is data in the alternative 10-bit data other than the specified-digit data, din[m] is specified-digit data in the 8-bit data, F is data determined based on at least one of other digit data in the 8-bit data, $\sim$ represents performing an inversion operation, and $\hat{\ }$ represents performing an exclusive OR operation.

3. The method as claimed in claim 2, wherein, the encoding 8-bit data corresponding to a to-be-encoded byte of to-be-transmitted data into alternative 10-bit data comprises:
   encoding the 8-bit data into the alternative 10-bit data as follows:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the alternative 10-bit data, $9\geq i\geq 0$, and i is an integer; din[j] is the (j+1)-th digit data in the 8-bit data, $7\geq j\geq 0$, and j is an integer, and & represents performing an AND operation, and | represents performing an OR operation.

4. The method as claimed in claim 1, wherein the first-digit data of the alternative 10-bit data is a first numerical value, and the detecting whether the first-digit data of the alternative 10-bit data is the same as the previous-digit data adjacent to the first-digit data comprises:
   detecting whether the previous-digit data is the first numerical value;
   determining that the first-digit data is same as the previous-digit data when the previous-digit data is the first numerical value; and
   determining that the first-digit data is different from the previous-digit data when the previous-digit data is not the first numerical value.

5. The method as claimed in claim 1, wherein the method further comprising:
   adding a first identification code at a preset position of the encoded to-be-transmitted data to obtain target data, the first identification code being preset 10-bit data, the first identification code comprising at least 6 consecutive digits of the same data, the first identification code is configured to be used for identifying transmitted content, start of transmission or end of transmission, and the encoded to-be-transmitted data comprising the target 10-bit data obtained by encoding the 8-bit data corresponding to the to-be-encoded byte for sending.

6. The method as claimed in claim 1, wherein the method further comprises:
   splicing a first identification code and a second identification code to obtain a combined code, wherein both the first identification code and the second identification code are preset 10-bit data and comprise at least 6 consecutive digits of the same data, and the second identification code is different from the first identification code; and
   adding the combined code at a preset position of the encoded to-be-transmitted data to obtain target data for sending.

7. An encoding method, comprising:

$enc[9]=\sim din[3]$;

$enc[8]=\sim din[3]\hat{\ }din[7]$;

$enc[7]=\sim din[3]\hat{\ }din[4]$;

$enc[6]=\sim din[3]\hat{\ }((\sim din[2]\&\sim din[1]\&\sim din[4])|(din[2]\&din[0])|(din[1]\&din[0]))$;

$enc[5]=\sim din[3]\hat{\ }((\sim din[2]\&\sim din[1]\&\sim din[4])|(din[2]\&\sim din[0])|(din[1]\&\sim din[0]))$;

$enc[4]=\sim din[3]\hat{\ }din[6]$;

$enc[3]=\sim din[3]\hat{\ }din[5]$;

$enc[2]=\sim din[3]\hat{\ }((din[2]\&\sim din[1])|(din[2]\&din[1]\&\sim din[3])|(\sim din[1]\&din[0]))$;

$enc[1]=\sim din[3]\hat{\ }((\sim din[2]\&din[1])|(din[2]\&din[1]\&\sim din[3])|(\sim din[2]\&\sim din[0]))$;

$enc[0]=\sim din[3]\hat{\ }din[3]$;

wherein enc[i] is the (i+1)-th digit data in the 10-bit data, $9\geq i\geq 0$, and i is an integer; din[j] is the (j+1)-th digit data in the 8-bit data, $7\geq j\geq 0$, and j is an integer; and $\sim$ represents performing an inversion operation, & represents performing an AND operation, | represents performing an OR operation, $\hat{\ }$ represents performing an exclusive OR operation, and the 8-bit data and the target 10-bit data is binary data.

8. An encoding apparatus, comprising:
an encoder configured to encode 8-bit data corresponding to a to-be-encoded byte of to-be-transmitted data into alternative 10-bit data, the to-be-transmitted data comprising at least one to-be-encoded byte;
a detector configured to detect whether a first-digit data of the alternative 10-bit data is same as a previous-digit data adjacent to the first-digit data, when the to-be-encoded byte is not a first byte of the to-be-transmitted data; and
wherein the encoder is further configured to be used for:
   inverting the alternative 10-bit data to obtain target 10-bit data, when a numerical value of the first-digit data is the same as that of the previous-digit data; and
   determining the alternative 10-bit data as the target 10-bit data, when the numerical value of the first-digit data is different from that of the previous-digit data,
wherein the 8-bit data, the alternative 10-bit data and the target 10-bit data are binary data.

9. The apparatus as claimed in claim 8, wherein
the alternative 10-bit data satisfies:

$enc[k1]=\sim din[m]$; and $enc[k2]=\sim din[m]\char`\^ F$, and wherein enc[k1] is specified-digit data in the alternative 10-bit data, enc[k2] is data in the alternative 10-bit data other than the specified-digit data, din[m] is specified-digit data in the 8-bit data, F is data determined based on at least one of other digit data in the 8-bit data, ~ represents performing an inversion operation, and ^ represents performing an exclusive OR operation.

10. The apparatus as claimed in claim 9, wherein
the encoder is configured to be used for:
encoding the 8-bit data into the alternative 10-bit data as follows:

$enc[9]=\sim din[3]$;

$enc[8]=\sim din[3]\char`\^ din[7]$;

$enc[7]=\sim din[3]\char`\^ din[4]$;

$enc[6]=\sim din[3]\char`\^ ((\sim din[2]\&\sim din[1]\&\sim din[4])|(din[2]\&din[0])|(din[1]\&din[0]))$;

$enc[5]=\sim din[3]\char`\^ ((\sim din[2]\&\sim din[1]\&\sim din[4])|(din[2]\&\sim din[0])|(din[1]\&\sim din[0]))$;

$enc[4]=\sim din[3]\char`\^ din[6]$;

$enc[3]=\sim din[3]\char`\^ din[5]$;

$enc[2]=\sim din[3]\char`\^ ((din[2]\&\sim din[1])|(din[2]\&din[1]\&\sim din[3])|(\sim din[1]\&din[0]))$;

$enc[1]=\sim din[3]\char`\^ ((\sim din[2]\&din[1])|(din[2]\&din[1]\&\sim din[3])|(\sim din[2]\&\sim din[0]))$;

$enc[0]=\sim din[3]\char`\^ din[3]$;

wherein enc[i] is the (i+1)-th digit data in the alternative 10-bit data, $9\geq i\geq 0$, and i is an integer; din[j] is the (j+1)-th digit data in the 8-bit data, $7\geq j\geq 0$, and j is an integer; and & represents performing an AND operation, and | represents performing an OR operation.

11. The apparatus as claimed in claim 8,
wherein the first-digit data of the alternative 10-bit data is a first numerical value, and wherein the detector is configured to be used for operations comprising:
   detecting whether the previous-digit data is the first numerical value;
   determining that the first-digit data is same as the previous-digit data when the previous-digit data is the first numerical value; and
   determining that the first-digit data is different from the previous-digit data when the previous-digit data is not the first numerical value.

12. The apparatus as claimed in claim 8, wherein the apparatus further comprises:
a processor for adding a first identification code at a preset position of the encoded to-be-transmitted data to obtain target data, the first identification code comprises preset 10-bit data, the first identification code comprising at least 6 consecutive digits of the same data, the first identification code configured to be used for identifying transmitted content, start of transmission or end of transmission, and the encoded to-be-transmitted data comprising the target 10-bit data obtained by encoding the 8-bit data corresponding to the to-be-encoded byte for sending.

13. The apparatus as claimed in claim 8, further comprising a processor, wherein the processor is configured to perform operations comprising:
splicing a first identification code and a second identification code to obtain a combined code, wherein both the first identification code and the second identification code are preset 10-bit data and comprise at least 6 consecutive digits of the same data, and the second identification code is different from the first identification code; and
adding the combined code at a preset position of the encoded to-be-transmitted data to obtain target data for sending.

14. An encoding apparatus, comprising:
an encoder for encoding 8-bit data corresponding to a to-be-encoded byte of to-be-transmitted data into target 10-bit data according to the method of claim 7.

15. A display apparatus, comprising:
a controller and a plurality of source driver chips, the controller comprising an encoding apparatus as claimed in claim 7.

16. The display apparatus as claimed in claim 15,
wherein the display apparatus is a liquid crystal display apparatus or an OLED display apparatus, and
wherein the controller comprises at least one of a timing controller, a System-on-Chip SOC or a micro-control unit MCU.

17. An encoding apparatus, comprising:
a processor; and
a memory for storing executable instructions of the processor,
wherein the processor is configured to implement the encoding method as claimed in claim 1.

18. A non-transitory computer readable storage medium, wherein when instructions in the non-transitory computer readable storage medium are executed by a processor, the processor is enabled to perform the encoding method as claimed in claim 1.

19. A signal transmission system, comprising:
a controller and a plurality of source driver chips,
wherein both the controller and each of the source driver chips comprise an encoding apparatus as claimed in claim 7.

* * * * *